United States Patent
Saito et al.

(10) Patent No.: US 12,208,571 B2
(45) Date of Patent: *Jan. 28, 2025

(54) RESIN POWDER FOR SOLID FREEFORM FABRICATION, DEVICE FOR SOLID FREEFORM FABRICATION OBJECT, AND METHOD OF MANUFACTURING SOLID FREEFORM FABRICATION OBJECT

(71) Applicant: Ricoh Company, Ltd., Tokyo (JP)

(72) Inventors: Akira Saito, Kanagawa (JP); Yasuyuki Yamashita, Kanagawa (JP); Kiichi Kamoda, Kanagawa (JP); Shigenori Yaguchi, Tokyo (JP); Nozomu Tamoto, Shizuoka (JP); Hitoshi Iwatsuki, Kanagawa (JP); Shinzo Higuchi, Tokyo (JP); Sohichiroh Iida, Kanagawa (JP); Yasuo Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,618

(22) Filed: Oct. 28, 2021

(65) Prior Publication Data

US 2022/0048245 A1    Feb. 17, 2022

Related U.S. Application Data

(62) Division of application No. 15/656,248, filed on Jul. 21, 2017, now Pat. No. 11,491,713.

(30) Foreign Application Priority Data

Jul. 22, 2016 (JP) .................................. 2016-144862
Mar. 14, 2017 (JP) .................................. 2017-049036
(Continued)

(51) Int. Cl.
*B29C 64/153* (2017.01)
*B33Y 70/00* (2020.01)
(Continued)

(52) U.S. Cl.
CPC ............ *B29C 64/153* (2017.08); *B33Y 70/00* (2014.12); *B33Y 70/10* (2020.01); *C08F 110/06* (2013.01);
(Continued)

(58) Field of Classification Search
CPC ............................... B29C 64/10; B33Y 10/00
See application file for complete search history.

(56) References Cited

U.S. PATENT DOCUMENTS 2,834,053 A    5/1958    Bilanin et al.
5,342,919 A    8/1994    Dickens, Jr. et al.
(Continued)

FOREIGN PATENT DOCUMENTS

CN    104910614    6/2017
EP    1 413 595    4/2004
(Continued)

OTHER PUBLICATIONS

ORGASOL 2003 Data Sheet (Year: 2019).*
(Continued)

*Primary Examiner* — Hoa (Holly) Le
(74) *Attorney, Agent, or Firm* — Grüneberg and Myers PLLC

(57) ABSTRACT

A resin powder for solid freeform fabrication has a 50 percent cumulative volume particle diameter of from 5 to 100 μm and a ratio (Mv/Mn) of a volume average particle diameter (Mv) to the number average particle diameter (Mn) of 2.50 or less and satisfies at least one of the following conditions (1) to (3):
(Continued)

(1): Tmf1>Tmf2 and (Tmf1−Tmf2)≥3 degrees C., both Tmf1 and Tmf2 are measured in differential scanning calorimetry measuring according to ISO 3146.
(2): Cd1>Cd2 and (Cd1−Cd2)≥3 percent, both Cd1 and Cd2 are measured in differential scanning calorimetry measuring according to ISO 3146, and
(3): C×1>C×2 and (C×1−C×2)≥3 percent.

6 Claims, 3 Drawing Sheets

(30)  Foreign Application Priority Data

Jun. 6, 2017   (JP) ................ 2017-111488
Jul. 14, 2017  (JP) ................ 2017-138268

(51) Int. Cl.
| | | |
|---|---|---|
| B33Y 70/10 | (2020.01) | |
| C08F 110/06 | (2006.01) | |
| C08G 8/02 | (2006.01) | |
| C08G 63/183 | (2006.01) | |
| C08G 67/00 | (2006.01) | |
| C08G 69/26 | (2006.01) | |
| C08J 3/12 | (2006.01) | |
| C08K 3/016 | (2018.01) | |
| C08K 5/00 | (2006.01) | |
| B29K 101/12 | (2006.01) | |
| B29K 105/00 | (2006.01) | |
| B33Y 10/00 | (2015.01) | |

(52) U.S. Cl.
CPC ............ C08G 8/02 (2013.01); C08G 63/183 (2013.01); C08G 67/00 (2013.01); C08G 69/26 (2013.01); C08J 3/12 (2013.01); C08K 3/016 (2018.01); C08K 5/0066 (2013.01); B29K 2101/12 (2013.01); B29K 2105/251 (2013.01); B29K 2995/0041 (2013.01); B33Y 10/00 (2014.12); C08J 2361/00 (2013.01); C08J 2361/16 (2013.01); C08J 2367/02 (2013.01); C08J 2367/04 (2013.01); C08J 2377/02 (2013.01); C08J 2377/08 (2013.01); C08J 2377/10 (2013.01)

(56) References Cited

U.S. PATENT DOCUMENTS

| | | | |
|---|---|---|---|
| 5,527,877 | A | 6/1996 | Dickens, Jr. et al. |
| 5,817,206 | A | 10/1998 | McAlea et al. |
| 6,245,281 | B1 | 6/2001 | Scholten et al. |
| 6,531,086 | B1 | 3/2003 | Larsson |
| 7,794,647 | B1 | 9/2010 | Deckard |
| 8,022,168 | B2 | 9/2011 | Weinhold et al. |
| 11,066,758 | B2* | 7/2021 | Saito ............ C08K 7/14 |
| 11,491,713 | B2* | 11/2022 | Saito ............ C08G 69/26 |
| 11,926,931 | B2* | 3/2024 | Saito ............ C08K 3/2279 |
| 2006/0246287 | A1 | 11/2006 | Gersch et al. |
| 2008/0124475 | A1 | 5/2008 | Kritchman |
| 2008/0166496 | A1 | 7/2008 | Monsheimer et al. |
| 2008/0258330 | A1 | 10/2008 | Muller et al. |
| 2009/0017219 | A1 | 1/2009 | Paasche et al. |
| 2009/0236775 | A1 | 9/2009 | Monsheimer et al. |
| 2011/0129682 | A1 | 6/2011 | Kurata et al. |
| 2011/0143108 | A1* | 6/2011 | Fruth ............ B33Y 30/00 442/334 |
| 2013/0323416 | A1 | 12/2013 | Bertelo et al. |
| 2015/0259247 | A1 | 9/2015 | Watanabe |
| 2015/0336292 | A1 | 11/2015 | Mikulak et al. |
| 2016/0038633 | A1* | 2/2016 | Watanabe ......... G03G 9/09321 524/417 |
| 2016/0215092 | A1* | 7/2016 | Vanelli ............ C08G 69/02 |
| 2016/0230021 | A1 | 8/2016 | Yoshino et al. |
| 2017/0008233 | A1 | 1/2017 | Vontorcik, Jr. et al. |
| 2017/0260359 | A1 | 9/2017 | Hanyu et al. |
| 2018/0023219 | A1 | 1/2018 | Salto et al. |
| 2018/0105669 | A1* | 4/2018 | Otsubo ............ C08K 3/04 |
| 2018/0264720 | A1* | 9/2018 | Tamoto ............ B29C 64/268 |
| 2018/0264721 | A1 | 9/2018 | Iida et al. |
| 2018/0355144 | A1 | 12/2018 | Saito et al. |

FOREIGN PATENT DOCUMENTS

| | | |
|---|---|---|
| EP | 2 177 557 | 4/2010 |
| EP | 2 985 269 | 2/2016 |
| EP | 3 239 214 | 11/2017 |
| EP | 3 272 787 | 1/2018 |
| EP | 3272788 A1 | 1/2018 |
| EP | 3272788 B1 | 7/2020 |
| EP | 3 750 943 | 12/2020 |
| JP | 11-216779 | 8/1999 |
| JP | 2003246864 | 9/2003 |
| JP | 2004-114685 | 4/2004 |
| JP | 2006-321711 | 11/2006 |
| JP | 2007-523774 | 8/2007 |
| JP | 2009-013395 | 1/2009 |
| JP | 2009-138138 | 6/2009 |
| JP | 2010-006057 | 1/2010 |
| JP | 2011-107341 | 6/2011 |
| JP | 2013-543457 | 12/2013 |
| JP | 2015-500375 | 1/2015 |
| JP | 2017-43654 | 3/2017 |
| JP | 2017-111489 | 6/2017 |
| WO | 2005/082973 | 9/2005 |
| WO | 2007/048536 | 5/2007 |
| WO | 2008/057844 | 5/2008 |
| WO | 2008/122426 | 10/2008 |
| WO | 2009/114715 | 9/2009 |
| WO | 2009/135521 | 11/2009 |
| WO | 2011/051250 | 5/2011 |
| WO | 2013/090174 | 6/2013 |
| WO | 2013/138204 | 9/2013 |
| WO | 2015/109143 | 7/2015 |
| WO | 2016/084928 | 6/2016 |
| WO | 2016/101942 | 6/2016 |
| WO | 2016/104140 | 6/2016 |

OTHER PUBLICATIONS

Full Public Report of ORGASOL 2001/2002/2003 (Year: 2008).*
Horiba Scientific, "A Guidebook to Particle Size Analysis", 2019, 32 pages.
Summons to Attend Oral Proceedings pursuant to Rule 115(1) EPC, dated Dec. 23, 2021 in European Application No. 17182489.9, 17 pages.
Extended European Search Report dated Aug. 17, 2022, in European Application 22168529.0, 6 pages.
Data Sheet, "Orgasol ® Polyamide Powders", published 2012, 3 pages.
Publication date of data sheet Orgasol, Sep. 26, 2012, 1 page.
English translation of Japanese Publication No. 2015-500375, 19 pages.
English translation of Japanese Publication No. 2017043654, 16 pages.
Berretta et al., "Morphology of polymeric powders in Laser Sintering (LS): from polyamide to new PEEK powders", European Polymer Journal, Mar. 8, 2016, 28 pages.
Brief Communication received for European Patent Application No. 20177083.1, mailed on Jan. 26, 2023, 41 pages.
Exhibits A-3A of Opposition Against JP Patent No. 6402810 B1 filed by Toray Industries Inc., Mar. 25, 2019, 65 pages including English Translation.
Exhibits A-5A of Opposition Against JP Patent No. 6402810 B1 filed by Toray Industries Inc., Oct. 25, 2019, 28 pages including English Translation.

(56) References Cited

OTHER PUBLICATIONS

Decision revoking the European Patent (Art. 101(2) EPC), EP 3272788B, received in European Patent Application No. 17182489.9, mailed on Sep. 30, 2022, 2 pages.
Summary of Facts and Submissions for revoking the European Patent (Art. 101(2) EPC), EP 3272788B, received in European Patent Application No. 17182489.9, mailed on Sep. 30, 2022, 30 pages.
Communication of a notice of opposition received for European Patent Application No. 20177083.1, Arkema France, mailed on Jan. 24, 2023, 108 pages with partial English translation.
Communication of a notice of opposition received for European Patent Application No. 20177083.1, Evonik Operations GmbH, mailed on Jan. 25, 2023, 8 pages.
Communication of notices of opposition (R.79(1) EPC), Notice of Opposition filed within opposition period by Arkema France and Evonik Operations GmbH for European Patent Application No. 20177083.1, mailed on Feb. 1, 2023, 2 pages.
Parent Application Specification as filed of European Patent Application No. 17182489.9, filed on Jul. 21, 2017, 48 pages.
Exploitation d'image MEB of *Thermal and Molecular Properties of Polymer Powders for Selective Laser Sintering (SLS)*, 2016, 6 pages including translation.
Certified U.S. Appl. No. 61/630,443, Lewis et al., filed Dec. 12, 2011, 63 pages.
Malvern, "A basic guide to particle characterization", 2015, Malvern Instruments Limited, pp. 1-23.
Morphologi G3 User Manual, Aug. 11, 2008, 40 pages.
Response of the patentee; Response to Rule 70(2) EPC Invitation, dated Jun. 15, 2021, for European Patent Application No. 20177083.1, 5 pages.
Schmid et al., "Thermal and Molecular Properties of Polymer Powders for Selective Laser Sintering (SLS)", AIP Conference Proceedings, vol. 1779, Oct. 31, 2016, pp. 100003-1-100003-5.
SEM Images, Orgasol 2003, cited on Jan. 19, 2023 in D20, pp. S.1-S.2.
Data sheet of VESTOSINT 1115 nf V200318, Feb. 21, 2019, 2 pages.
DCS measurement of VESTOSINT® 1115 naturfarben, Polyamid-12 feinpulver, Product Information, Degussa-Hüls AG, cited on Jan. 19, 2023 in D20, 1 page.
Le/ Date Jun. 30, 2023 Considered.
European Brief Communication Opposition proceeding dated Feb. 2, 2024, in European Patent Application No. 20177083.1, Patent No. 3750943, 12 pages.
Consolidated list of cited opposition documents dated Jan. 29, 2024, in European Patent Application No. 20177083.1, 3 pages.
Brief Communication—Opposition proceedings dated Oct. 20, 2023, in European Patent Application No. 20177083.1, Patent No. 3750943, 20 pages.
Consolidated List of cited opposition documents dated Oct. 17, 2023, in European Patent Application No. 20177083.1, 3 pages.
Jeffrey Bodycomb, Ph.D, "Image Analysis: Evaluating Particle Shape", Calculation of the Circulatory Horiba 2011, Horiba.com, Citation D63 of consolidated list of cited opposition documents dated Oct. 17, 2023, in European Patent Application No. 20177083.1, 2 pages.
"FPIA-3000 brochure", Malvern, Citation D64 of consolidated list of cited opposition documents dated Oct. 17, 2023, in European Patent Application No. 20177083.1, 12 pages.
Measurement of the particle parameters in FIG 8 of D1, 4 pages, Citation D62 of consolidated list of cited opposition documents dated Oct. 17, 2023, in European Patent Application No. 20177083.1.
"Top 10 Errors in Particle Analysis and how to avoid them", Microtrac Retsch GmbH, Part of Vender Scientific, pp. 1-7, Citation D58 of consolidated list of cited opposition documents dated Oct. 17, 2023, in European Patent Application No. 20177083.1.
"Microtrac_Active Models & Discontinued Products List", Citation D59 of consolidated list of cited opposition documents dated Oct. 17, 2023, in European Patent Application No. 20177083.1, 8 pages.
Office Action in the proceedings of the second divisional application (Appl. No. 22 168 529.0), Citation D61 of consolidated list of cited opposition documents dated Oct. 17, 2023, in European Patent Application No. 20177083.1, 3 pages.
"Software Explanation of Data Reported by Microtrac Instruments", Microtrac.com, Citation D60 of consolidated list of cited opposition documents dated Oct. 17, 2023, in European Patent Application No. 20177083.1, 8 pages.
A-3A report from opposition filed by Toray industries in JP 6402810, dated Mar. 25, 2019, 63 Pages, inlcuding English translation.
A-5A report from opposition filed by Toray industries in JP 6402810, dated Oct. 25, 2019, 27 Pages, including English translation.
Analysis of Cite No. A105 cited herein from Opposition Filed on Apr. 8, 2021 for European Patent Application No. 17182489.9, Cite No. A95 herein, 2 pages.
Analysis of Cite No. A107 from cited herein from Opposition Filed on Apr. 8, 2021 for European Patent Application No. 17182489.9, Cite No. A95 herein, 4 pages Analysis provided by Opposition 3, dated Apr. 8, 2021, 2 pages.
Analysis provided by Opposition 3, dated Apr. 8, 2021, 2 pages.
Arkema, "Invoices for order of Orgasol 2003 LS, 2012", 20 pages.
Arkema, "Orgasol® Polyamide Powders", General Bulletin, Sep. 26, 2012, 4 pages.
Arkema, Supply Agreement, Jul. 26, 2012, 1 page.
Bourell et al., "Performance limitations in polymer laser sintering", 8th International Conference on Photonic Technologies LANE 2014, Physics Procedia, vol. 56, 2014, pp. 147-156.
Certificate Orgasol, Jun. 20, 2012, 6 pages.
Certificates of Experimental Results, Oct. 25, 2019, partial English translation of Cite No. A65 cited herein from Opposition Filed on Apr. 8, 2021 for European Patent Application No. 17182489.9, Cite No. A95 herein, 20 pages.
Certificates of Experimental Results, Exhibit A-3A, Mar. 25, 2019, 63 pages, including English translation.
Certificates of Experimental Results, Exhibit A-5A, Oct. 25, 2019, 7 pages.
"Chemical Dictionary 8", Chemical Dictionary Editorial Committee, 2006, 4 pages.
Combined Office Action and Search Report issued May 7, 2019, in Chinese Patent Application No. 201710599617.3, citing document A101 therein, 8 pages (with English translation of categories of cited documents).
Email correspondence for the order of Orgasol 2003 LS with attachments, 2012, 15 Pages.
Emmanuel Dumoulin, "Fabrication additive de pièces en polymères thermoplastiques hautes performances et en polyamide 12 par le procédé de frittage sélectif par laser", HAL Archives-Ouvertes, Jan. 23, 2013, 263 pages, with partial English translation.
English translation of JP 2015-500375, 30 pages provided by Opposition Filed on Apr. 8, 2021, for European Patent Application No. 17182489.9, Cite No. A95 herein.
Excerpt from Camsizer Handbook, 1 page.
"Experiment Report (PA 12: test data on melting point of product name of VESTOSINT 1115 nf V200318)", Evonik Resource Efficiency GmbH, 2019, 4 pages.
Extended European Search Report issued Dec. 5, 2017, in Patent Application No. 17182489.9, citing references A1, A18, A12, A49 and A24 therein, 7 pages.
Fulcher et al., "Effect of segregated first and second melt point on laser sintered part quality and processing", 2012, pp. 556-564.
Gardner et al., "Structure, crystallization and morphology of poly(aryl ether ketone ketone)", Polymer, vol. 33, No. 12, 1992, pp. 2483-2495.
Ghita et al., "Physico-chemical behavior of Poly (Ether Ketone) (PEK) in High Temperature Laser Sintering (HT-LS)", Journal of Materials Processing Technology, vol. 214, 2014, pp. 969-978.
ISO 3146, Jun. 1, 2000, 8 pages, with English translation.
ISO 9276-2, May 15, 2014, 36 pages.
Japanese Evidence Certificate by Toray on Jan. 30, 2020, in Patent Application No. 2019-700260, 19 pages.

(56) References Cited

OTHER PUBLICATIONS

Japanese Experimental Certificate by Toray on Oct. 25, 2019, in Patent Application No. 2019-700260, 20 pages.
Japanese Notice of Reasons for Revocation issued on Jan. 30, 2020, in Japanese Patent Application No. 6402810, citing documents A83, A80 and A79, 38 pages (with partial English Translation).
Japanese Office Action issued on May 29, 2018, in Patent Application No. 2017-138268, 2 pages.
Japanese Statement by Toray issued on Oct. 30, 2019, in Patent Application No. 2019-700260, 1 page.
Measuring—Orgasol 2003 LS, 5 pages.
Measuring—Orgasol 2003, LS, 5.
Measuring PP R201, 4 pages.
"Measuring result of Polypropylen-Pulvers, PP R201", Mar. 1, 2021, 1 page.
Measuring Tmf1 and Tmf2 (Orgasol 2003), LS; partial English translation included, 1 page.
Measuring Tmf1 and Tmf2 (PP R201), 1 page.
Office Action in corresponding European Patent Application No. 20177083, issued Oct. 23, 2020.
Office Action issued Apr. 10, 2019, in Japanese Patent Application No. 6402810, citing documents A29, A50, A38, A66, A72 and A98 therein, 45 pages (with partial English translation).
Office Action Issued Apr. 5, 2019, in Japanese Patent Application No. 6402810, citing document A38 therein, 50 pages (with partial English translation).
Office Action issued Jul. 16, 2019, in Japanese Patent Application No. 6402810, 50 pages (with partial English translation).
Opposition Filed on Apr. 8, 2021, for European Patent Application No. 17182489.9, 22 pages.
Opposition Filed on Apr. 8, 2021, for European Patent Application No. 17182489.9, 34 pages, with English translation.
Opposition Filed on Apr. 8, 2021, for European Patent Application No. 17182489.9, 55 pages, with English translation.
PerkinElmer, Differential Scanning Calorimetry (DSC), A Beginner's Guide, 2010, 16 pages.
"Product information on VESTOSINT 1115 naturfarben Polyamid-12 Feinpulver", Degussa-Hüls AG, 2000, 2 pages.
Reference MB14a from Opposition Filed on Apr. 8, 2021 for European Patent Application No. 17182489.9, Cite No. A95 herein ,3 pages.
Reference MB14b from Opposition Filed on Apr. 8, 2021 for European Patent Application No. 17182489.9, Cite No. A95 herein, 3 pages.
Ricoh Introduces Selective Laser Sintering (SLS) Industrial Grade 3D Printer Ricoh AM S5500P, 24Maker.com, https://www.24maker.com/thread-10456-1.1html, 2015, 7 pages (with partial English translation).
Schmid et al., "Additive Manufacturing: Polymers applicable for Laser Sintering (LS)", International Conference on Manufacturing Engineering and Materials, ICMEM, 2016, Procedia Engineering, vol. 149, Jun. 6-10, 2016, pp. 457-464.
Schmid et al., Analysis of A107 from Opposition Filed on Apr. 8, 2021 for European Patent Application No. 17182489.9, Cite No. A96 herein, 6 pages.
M. Schmid et al., "iCoPP-Polypropylen für Additive Manufacturing", Additive Manufacturing Forschung Plastics, Now!, Oct. 2012, pp. 2-3, with partial English translation.
Schmid et al., "iCoPP—A New Polyolefin for additive manufacturing (SLS)", International Conference on Additive Manufacturing, Loughborough UK, Jul. 11-13, 2011, 17 pages.
Schmid et al., "Influence of the Origin of Polyamide 12 Powder on the Laser Sintering Process and Laser Sintered Parts", Applied Sciences, vol. 7, No. 462, 2017, pp. 1-15.
Schmid et al., "Materials perspective of polymers for additive manufacturing with selective laser sintering", Journal of materials Research, vol. 29(17), Jul. 8, 2014, pp. 1824-1832.
Schmid et al., "Polymer powders for selective laser sintering (SLS)", AIP Conference Proceedings, vol. 1664, May 22, 2015, pp. 160009-1-160005.
Schmid et al., "Presentation: iCoPP—A New Polyolefin for additive manufacturing (SLS)", International Conference on Additive Manufacturing, Loughborough UK, Jul. 11-13, 2011, 29 pages.
Sommereyns et al., "Evaluation of essential powder properties through complementary particle size analysis methods for laser powder bed fusion of polymers", 11th CIRP Conference on Photonic Technologies [LANE 2020], vol. 94, Sep. 7-10, 2020, pp. 116-121.
Stephane Dupin, Etude fondamentale de la transformation du polyamide 12 par frittage laser: mécanismes physico-chimiques et relations microstructures/propriétés, HAL Archives-Ouvertes, Jul. 5, 2012, 224 pages, with partial English translation.
Tencé-Girault et al., "Simultaneous SAXS-WAXS Experiments on Semi-Crystalline Polymers: Example of PA11 and Its Brill Transition", Crystals, vol. 9, No. 271, 2019, pp. 1-17.
Vanelli et al., U.S. Appl. No. 61/630,443, filed Dec. 12, 2011, 63 pages.
Verbelen et al., "Characterization of polyamide powders for determination of laser sintering processability", European Polymer Journal, vol. 75, 2016, pp. 163-174.
Vestosint®, "Vestosint® 1115 naturfarben", Data Sheet, 1 page, with partial English translation.
VICTREX® PEEK 150PF, Material Data Sheet, revised 2018), 2018.
Wulfhorst et al., Forschungsbericht RWTH Aachen, 2011, pp. 1-121, with partial English translation.
Wulfhorst et al., "Substitution of powders by ultra short cut fibers for selective laser sintering (SLS)", AUTEX Conference, Jun. 8-10, 2011, pp. 13-18.
Yukio Kanehara, Trial Corporation Presentation, 2 AM-Symposium, Jan. 25, 2012, 54 pages, including English translation.

* cited by examiner

RESIN POWDER FOR SOLID FREEFORM FABRICATION, DEVICE FOR SOLID FREEFORM FABRICATION OBJECT, AND METHOD OF MANUFACTURING SOLID FREEFORM FABRICATION OBJECT

CROSS-REFERENCE TO RELATED APPLICATIONS

This patent application is a divisional application of U.S. application Ser. No. 15/656,248, filed Jul. 21, 2017, which is based on and claims priority pursuant to 35 U.S.C. § 119 to Japanese Patent Application Nos. 2016-144862, 2017-049036, 2017-111488, and 2017-138268, filed on Jul. 22, 2016, Mar. 14, 2017, Jun. 6, 2017, and Jul. 14, 2017, respectively, in the Japan Patent Office. The entire disclosures of each application are hereby incorporated by reference herein.

BACKGROUND

Technical Field

The present invention relates to resin powder for solid freeform fabrication, a device for solid freeform fabrication object, and a method of manufacturing solid freeform fabrication object.

Description of the Related Art

Powder bed fusion (PBF) methods include a selective laser sintering (SLS) method of forming a solid freeform fabrication object by selective irradiation and a selective mask sintering (SMS) method of applying laser beams in planar form using a mask.

A device employing the PBF method selectively irradiates a thin layer of powder of metal, ceramics, or resin with laser beams to melt and attach the powder to each other to form a layer thereof and repeats this operation to laminate layers to obtain a solid freeform fabrication object (3D object).

In the case of resin powder for the PBF method, while maintaining inner stress between the thin layers low and relaxing the stress, the layers of the resin powder supplied to a supply ink are heated to temperatures close to the softening point of the resin. Thereafter, the heated layer is selectively irradiated with laser beams to raise the temperature of the resin powder to the softening point or higher so that the resin powder is fused and attached to each other to conduct solid freeform fabrication.

Currently, polyamide resins are commonly used in PBF method. In particular, polyamide 12 is suitably used because it has a relatively low melting point, incurs low heat contraction, and has poor water absorbency among polyamides.

Demands for making not only prototypes but also products have been increasing so that expectations of research and development and launching of various types of resins suitable for PBF methods haven been rising.

SUMMARY

According to an embodiment of the present disclosure, provided is an improved resin powder for solid freeform fabrication wherein the resin powder has a 50 percent cumulative volume particle diameter of from 5 to 100 μm and the ratio (Mv/Mn) of the volume average particle diameter (Mv) to the number average particle diameter (Mn) of 2.50 or less and satisfies at least one of the following conditions (1) to (3):

(1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for a first time and Tmf2 represents a melting starting temperature of an endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Tmf1 and Tmf2 are measured in differential scanning calorimetry measuring according to ISO 3146, wherein the melting starting temperature of the endothermic peak represents a temperature at a point −15 mW lower from a straight line parallel to X axis drawn from a site where quantity of heat becomes constant after endotherm at the melting point finishes to a lower temperature side, (2): Cd1>Cd2 and (Cd1−Cd2)>3 percent, where Cd1 represents a crystallinity obtained from an energy amount of the endothermic peak when the resin powder is heated to a temperature 30 degrees C. higher than the melting point of the resin powder at a temperature rising speed of 10 degrees C. per minute for a first time and Cd2 represents a crystallinity obtained from an energy amount of the endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146, and (3): Cx1>Cx2 and (Cx1−Cx2)≥3 percent, where Cx1 represents a crystallinity of the resin powder obtained by X-ray diffraction measuring and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

BRIEF DESCRIPTION OF THE SEVERAL VIEWS OF THE DRAWINGS

Various other objects, features and attendant advantages of the present disclosure will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1A:
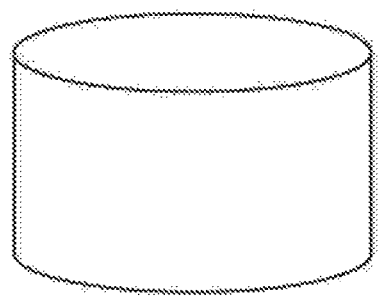
FIG. 1A is a diagram illustrating a schematic perspective view of an example of a cylindrical form.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and the" are intended to include the plural forms as well, unless the context clearly indicates otherwise.

Moreover, image forming, recording, printing, modeling, etc. in the present disclosure represent the same meaning, unless otherwise specified.

Resin Powder for Solid Freeform Fabrication

The resin powder for solid freeform fabrication (crystalline thermoplastic resin composition) of the present disclosure has a 50 percent cumulative volume particle diameter of from 5 to 100 μm and a ratio (Mv/Mn) of the volume average particle diameter (Mv) to the number average particle diameter (Mn) of 2.50 or less and satisfies at least one of the following conditions (1) to (3):

(1): Tmf1>Tmf2 and (Tmf1−Tmf2)≥3 degrees C., preferably (Tmf1−Tmf2)>5 degrees C., (Tmf1−Tmf2) 10 degrees C. where Tmf1 represents a melting starting temperature of an endothermic peak as the resin powder is heated t(1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for the first time and Tmf2 represents a melting starting temperature of an endothermic peak as the resin powder is heated for the first time as mentioned above, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Tmf1 and Tmf2 are measured in differential scanning calorimetry measuring according to ISO 3146. The melting starting temperature of the endothermic peak represents a temperature at a point −15 mW lower from a straight line parallel to X axis drawn from a site where quantity of heat becomes constant after endotherm at the melting point finishes to a lower temperature side, (2): Cd1>Cd2 and (Cd1−Cd2)≥3 percent, where Cd1 represents a crystallinity obtained from an energy amount of the endothermic peak as the resin powder is heated to a temperature 30 degrees C. higher than the melting point of the resin powder at a temperature rising speed of 10 degrees C. per minute for the first time and Cd2 represents a crystallinity obtained from an energy amount of the endothermic peak as the resin powder is heated for the first time as mentioned above, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Cd1 and Cd2 are measured in differential scanning calorimetry measuring according to ISO 3146.

(3): C B 1>C B 2 and (C B 1−C B 2)≥3 percent, preferably (C B 1−C B 2) 5 percent, and more preferably (C B 1−C B 2)≥10 percent, where C B 1 represents the crystallinity of the resin powder obtained by X-ray diffraction measuring and C B 2 represents the crystallinity obtained by X-ray diffraction measuring as the resin powder is heated to a temperature 30 degrees C. higher than the melting point thereof at a temperature rising speed of 10 degrees C. per minute, thereafter cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

Typical resin powder stiffens at sites not irradiated with laser beams after a device employing PBF method is used so that the amount of waste polymer increases. In addition, since a significant amount of powder not irradiated with laser beams remains due to selective irradiation in PBF method, increasing recyclability of non-irradiated powder (extra powder) in PBF method has been tried. However, the results are not sufficient. Moreover, powder material irradiated with laser beams or heated tends to change so that it is inferior to fresh powder regarding melt viscosity and flowability. As a result, all the powder material is abandoned when used twice or three times, which leads to poor recyclability. In general, to increase the number of usage, about a half to about 80 present of powder material is fresh powder. To use crystalline thermoplastic resin powder, it is necessary to impart properties to the powder as the crystalline thermoplastic resin powder for PBF method.

In the relations (1) to (3), properties of the identical resin powder for solid freeform fabrication are regulated from different points of views. The relations (1) to (3) are relevant to each other. The resin powder for solid freeform fabrication of the present disclosure can be identified if the resin powder for solid freeform fabrication satisfies at least one of the relations.

The resin powder for solid freeform fabrication preferably contains crystalline thermoplastic resin.

In the present disclosure, crystal-controlled crystalline thermoplastic resin is used as the thermoplastic resin powder. The crystalline thermoplastic resin means crystalline resin having thermoplasticity and has a melting peak as measured according to ISO 3146 (Testing Methods for Transition Temperatures of Plastics JIS K7121).

In the crystal-controlled crystalline thermoplastic resin, the crystal size and the crystal alignment are controlled by heat treatment, extension, stimuli from outside, etc. Specifically, powder is subject to annealing treatment in which the powder is heated at temperatures not lower than the glass transition temperature of each resin contained in the powder to increase crystallinity. Also, a method of applying ultrasonic wave to enhance crystallinity, a method of dissolution in a solvent and slow evaporation to enhance crystallinity, a method of including a process of applying an external electric field to grow crystal, and a method of processing such as pulverizing a highly-aligned and highly crystallized article obtained by extension are suitable to obtain highly crystalline resin powder. In general, the crystallinity (crystallized ratio) is reset when heated and melted at temperatures not lower than the melting point. Therefore, crystallinity close to the state of no crystal control can be measured when heated at temperatures not lower than the melting point and sufficiently melted, cooled down, and heated again.

In the annealing, the powder is heated at the temperature 50 degrees higher than the glass transition temperature thereof for three days and thereafter slowly cooled down to room temperature.

Melted resin for solid freeform fabrication is extruded in fibrous form by an extruder after stirring at temperatures 30 degrees C. or greater higher than the melting point. The melted resin is extended to 2 to 10 times and thereafter the thus-obtained fiber is cut to 0.03 to 5 mm to obtain powder. If the powder is obtained by cutting the fiber, the powder has a polygonal pillar-like form. On the other hand, if the size distribution of the powder is not sufficient, the powder is subject to frost shattering at −200 degrees C. In addition, it is optional to spheroidize the powder after each treatment.

In the application of ultrasonic wave, glycerin (reagent grade, manufactured by Tokyo Chemical Industry Co. Ltd.) solvent is added to a resin in an amount of five times as much as the resin followed by heating to the temperature 20 degrees C. higher than the melting point. Thereafter, ultrasonic wave is applied thereto by an ultrasonic generator (ultrasonicator UP200S, manufactured by Hielscher Ultrasonics GmbH) at a frequency of 24 KHz and an amplitude of 60 percent for two hours. Thereafter, the resultant is rinsed with a solvent of isopropanol at room temperature preferably followed by vacuum drying.

The external electric field application is conducted by heating powder at the glass transition temperature or higher, applying an alternative electric field (500 Hz) of 600 V/cm thereto for one hour, and slowly cooling it down.

The resin powder for solid freeform fabrication satisfies at least one of the following relations (conditions) (1) to (3) from those points of views.

Figure 3A:
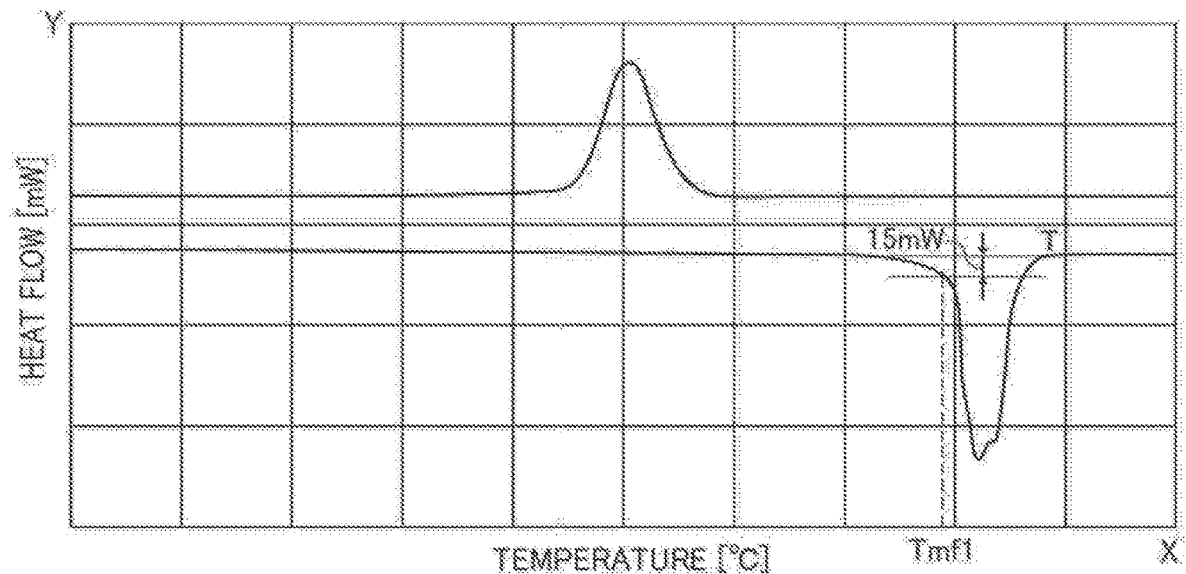
FIG. 3A is a diagram illustrating the melting starting temperature (Tmf1) of the endotherm peak.
Figure 3B:
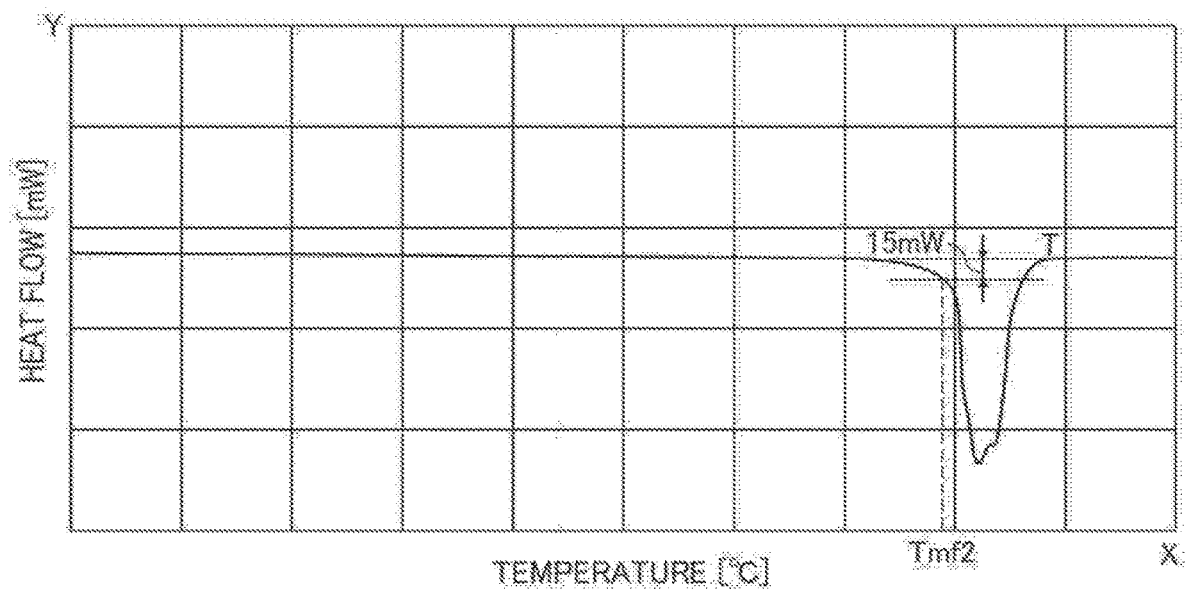
FIG. 3B is a diagram illustrating the melting starting temperature (Tmf2) of the endotherm peak.

Measuring Method of Melting Starting Point of Condition 1 According to Differential Scanning Calorimetry Measuring The measuring method of melting starting temperature of differential scanning calorimetry (DSC) of the condition (1) is based on the measuring method of ISO 3146 (Testing Methods for Transition Temperatures of Plastics, JS K7121). A differential scanning calorimeter (for example, DSC-60A, manufactured by Shimadzu Corporation) is used to measure the melting starting temperature (Tmf1) of the endothermic peak when the resin powder is heated to the temperature 30 degrees C. higher than the melting point thereof for the first time at a temperature rising speed of 10 degrees C. per minute. Thereafter, the resin powder is cooled down to −30 degrees C. or lower at a temperature falling speed of 10 degrees C. per minute (Cycle 1, FIG. 3A) and heated to the temperature 30 degrees C. higher than the melting point for the second time at a temperature rising speed of 10 degrees C. per minute to measure the melting starting temperature (Tmf2) of the endothermic peak (Cycle 2, FIG. 3B). The melting starting temperature of the endothermic peak represents a temperature at a point −15 mW lower from a straight line parallel to X axis drawn from a site where quantity of heat becomes constant after endotherm at the melting point finishes to the lower temperature side. As illustrated in FIGS. 3A and 3B, the melting starting temperature of the endothermic peak is a temperature (Tmf) corresponding to the intersection of the endothermic peak and −15 mW lower from a straight line parallel to X axis (temperature axis) drawn from a site where quantity of heat becomes constant after endotherm at the melting point finishes to the lower temperature side. Alternatively, the melting starting temperature is the intersection between the straight line of the base line on the low temperature side extended into the high temperature side and a tangent of the curve on the low temperature side of the melting peak at the point where the gradient is the maximum.

Measuring Method of Crystallinity of Condition 2 According to Differential Scanning Calorimetry Measuring The measuring method of crystallinity of differential scanning calorimetry (DSC) of the condition (2) is based on the measuring method according to ISO 3146 (Testing Methods for Transition Temperatures of Plastics, JIS K7121). The energy amount (heat amount of melting) of an endothermic peak when heated to the temperature 30 degrees C. higher than the melting point of powder resin is measured to obtain crystallinity (Cd1) from the heat amount of melting to the heat amount of perfect crystallization. Thereafter, the resin powder is cooled down to −30 degrees C. or lower at a temperature falling speed of 10 degrees C. per 10 minute and heated to the temperature 30 degrees C. higher than the melting point at a temperature rising speed of 10 degrees C. per minute to measure the energy amount of the endothermic peak so that crystallinity (Cd2) can be obtained from the heat amount of melting to the heat amount of perfect crystallization.

Measuring Method of Crystallinity of Condition 3 According to X-Ray Analyzer

Crystallinity of resin powder of the condition 3 is obtained by, for example, placing the resin powder on glass plate to measure crystallinity (C×1) thereof by an X-ray analyzer including a two-dimensional detector (for example, Discover 8, manufactured by Bruker) at a 2θ range of from 10 to 40 at room temperature. Next, in the DSC, in a nitrogen atmosphere, the resin is heated to 30 degrees C. higher than the melting point thereof at a temperature rising speed of 10 degrees C. per minute. The temperature is kept for 10 minutes and the temperature of the sample (resin powder) is returned to room temperature after being cooled down to −30 degrees C. at a temperature falling speed of 10 degrees C. per minute. Crystallinity (C×2) can be measured like C×1.

The melting point means a melting peak temperature measured according to ISO 3146 (Testing Methods for Transition Temperatures of Plastics. JIS K7121). When a plurality of melting points exist, the melting point on the higher temperature side is used. When crystallinity is controlled, the ratio of fine crystal or non-crystal decreases. As a result, the starting temperature of the endothermic peak in the DSC shifts to high temperatures. Therefore, the endothermic temperature of a resin becomes clear so that a sharp melt waveform where the resin is melted at laser center portion is obtained. Sharp melt generally means that the melting starting temperature of a resin is high and the range between the starting temperature of the melting point and the endotherm ending peak temperature in the DSC is small so that desired melting conditions can be achieved in more controlled state. The melting point of the resin powder for solid freeform fabrication has no particular limit and is preferably 100 degrees C. or higher, more preferably 150 degrees C. or higher, and particularly preferably 200 degrees C. or higher.

The melting point can be measured according to ISO 3146 (Testing Methods for Transition Temperatures of Plastics, JIS K7121) using a differential scanning calorimeter (DSC).

Due to sharp melting, sintering accompanied by dissolution between resin around the portion irradiated with laser beams decreases, which leads to improvement of dimension stability and reduction of waste of resin. Consequently, recyclability ameliorates. Moreover, since crystallinity of the resin is high, the water absorption of resin can be suppressed. Bubbles caused by moisture during fabrication are not produced, which ameliorates dimension stability. In addition, during fabrication, the resin is heated by keeping the temperature, which causes hydrolysis, resulting in deterioration of the resin. However, since the water absorption is suppressed, deterioration of recyclability can be reduced.

The 50 percent cumulative volume particle diameter of the resin powder is from 5 to 200 µm and preferably from 5 to 100 µm, more preferably from 20 to 70 µm, and particularly preferably from 20 to 50 µm in terms of dimension stability. The ratio (Mv/Mn) of the volume average particle diameter (Mv) to the number average particle diameter (Mn) of the powder is 2.50 or less, preferably 2.00 or less, more preferably 1.50 or less, and particularly preferably 1.20 or less in terms of improvement of fabrication accuracy and recoating. The 50 percent cumulative volume particle diameter and Mv/Mn can be measured by, for example, particle size distribution measuring device (microtrac MT3300 EXII, manufactured by MicrotracBEL Corp).

The average circularity of the resin powder for solid freeform fabrication is preferably from 0.7 or higher and more preferably from 0.83 or higher in the particle size range of from 0.5 to 200 µm. The average circularity is an index to indicate the degree of circularity and the average circularity of 1 means true circle. The circularity is obtained by the following relation, where S represents an area (number of pixels) and L represents a perimeter.

$$\text{Circularity} = 4\pi S/L^2$$

Circularity of the resin powder for solid freeform fabrication is measured and the arithmetical average value is determined as the average circularity. For example, the average circularity can be easily obtained by digitization based on the measuring using a wet process flow type particle size and form analyzer (FPIA-3000, manufactured by Sysmex Corporation). This device takes particle images at high speed in a liquid suspension flowing in a glass cell by a charge-coupled device (CCD) and analyzes individual particle images in real time. This device is suitable to obtain the average circularity in the present disclosure. The number of measuring counts has no particular limit and is preferably 1,000 or greater and more preferably 3,000 or greater.

The specific gravity of the resin powder for solid freeform fabrication is preferably 0.8 or more. When the specific gravity is 0.8 or greater, it is preferable because secondary agglomeration of the particles during recoating can be prevented. Conversely, the specific gravity is preferably 3.0 or less to meet light-weight needs as a substitute of metal. The specific gravity can be obtained by measuring true specific gravity. The true specific gravity is obtained by measuring the density of a sample by measuring the mass thereof from the volume of the sample. The volume is obtained by changing volume and pressure of gas (He gas) at a constant temperature by using a dry-process pycnometer (AccuPyc 1330, manufactured by Shimadzu Corporation) utilizing gas-phase replacement method.

The form of the resin particle constituting the powder has no particular limit. Preferably, it is a pillar-like form. The particle having a pillar-like form has a ratio of the height of the particle to the diameter or the long side of the bottom of the particle of from 0.5 to 5, preferably from 0.7 to 2.0, and more preferably from 0.8 to 1.5. The proportion of the particle having a pillar-like form to the resin powder for solid freeform fabrication is preferably 50 percent by mass or greater, more preferably 70 percent by mass or greater, and particularly preferably 90 percent by mass or greater.

There is no specific limit to the pillar-like form. It can be suitably selected to suit to a particular application. For example, significantly cylindrical form and cuboid are preferable. Being the pillar-like form, particles can be packed without a space so that the tensile strength of an obtained solid freeform fabrication object can be enhanced. The pillar-like form preferably has sides facing each other. The sides facing each other may have an incline. However, they are preferable when they are parallel to each other without an incline in terms of productivity and stability of laser fabrication. The form of the particle can be observed by, for example, scanning electron microscope (S4200, manufactured by Hitachi Ltd.), wet-process particle size and form analyzer (FPIA-3000, manufactured by Sysmex Corporation), etc. Obtained particles may be subject to spheroidizingcal treatment or addition of external additives to improve powder flowability.

There is no specific limit to the significantly cylindrical form. It can be suitably selected to suit to a particular application. For example, true cylindrical form and cylindroid-like form are preferable. Of these, true cylindrical form is preferable. The circle portion of the significantly cylindrical form may partially chip. In addition, the significantly cylindrical (significantly circular) has a ratio of the major axis to the minor axis of from 1 to 10.

The significantly cylindrical form preferably has significantly circular planes facing each other. The size of the circles facing each other may not be completely identical but the diameter ratio of the large circle to the small circle is preferably 1.5 or less. More preferably, the ratio is 1.1 or less, meaning if the size is close to each other, particles can be packed more densely.

The diameter of the significantly cylindrical form has no particular limit and can be suitably selected to suit to a particular application. For example, the diameter is preferably from 5 to 200 µm. When the circle portion of the significantly cylindrical form is ellipse, the diameter means the major axis.

The height (distance between both planes) of the significantly cylindrical form has no particular limit and can be suitably selected to suit to a particular application. For example, the height is preferably from 5 to 200 µm.

The particle (pillar-like form particle) has a pillar-like form having a bottom and a top. Of these, forms having no points at ends are more preferable. The point means an end portion existing in the pillar-like form.

Figure 1B:
FIG. 1B is a diagram illustrating a side view of the cylindrical form illustrated in FIG. 1A.
Figure 1C:
FIG. 1C is a diagram illustrating a side view of an example of a cylindrical form with no points at ends.

For example, FIG. 1B is a side view of the cylindrical form illustrated in FIG. 1A. In this case, the cylindrical form has a rectangular form with four angle portions, i.e., points. FIG. 1C is a diagram illustrating an example of a form without such points. Whether a pillar-like form has a point is confirmed by a projected image of the side plane of the pillar-like form particle. For example, the side of a pillar-like form particle is observed by a scanning electron microscope (S4200, manufactured by Hitachi Ltd.), etc. to acquire a two-dimensional image. In this case, the projected image has four sides. When the portion formed of two adjacent sides is defined as an end part, if the end part is formed of only two adjacent straight lines, an angle is formed and the particle has a point. If the end part is arc as illustrated in FIG. 1C, no point is formed at the end portion.

Circularity of such a pillar-like form particle having no point can be increased so that flowability is enhanced and packing density can be more increased. This is extremely suitable to improve the strength of a solid freeform fabrication object and dimension accuracy.

It is most preferable that all the pillar-like form particles of the resin powder for solid freeform fabrication have no points at end portions. It is preferable that the proportion of the pillar-like form particles having no point at end portions be high. Specifically, the proportion of the pillar-like form particles having no point at end portions to all the pillar-like form particles is preferably 50 percent or more, more preferably 75 percent or more, and furthermore preferably 90 percent or more. Due to this, the average circularity of the resin powder increases, which is preferable for the present disclosure.

Whether the pillar-like form particle has no point at end portions can be determined by, for example, as described above, observing the resin powder with a scanning electron microscope (S4200, manufactured by Hitachi Ltd.), etc. to obtain two-dimensional images and calculating the proportion of the pillar-like form particles having no point at end portions to all the pillar-like form particles. For example, the two-dimensional images of 10 vision fields are obtained by the method described above to obtain the proportion of the pillar-like form particles having no point at end portions to all the pillar-like form particles and calculate the average.

The pillar-like form particle having no point at end portions has not necessarily neat significantly cylindrical forms or polygonal forms but may include a form with constriction, a form having an extended end portion, a crushed form, or a twisted or curved form in the projected image of side plane.

To make the pillar-like form particle in resin powder pointless at end portions, any method of rounding points of pillar-like form particles can be used. For example, it is possible to use known spheroidizing treatment devices utilizing mechanical pulverization of high speed rotation or high speed impact or surface melting utilizing mechanical abrasion.

The cuboid has no specific limit and is suitably selected to suit to a particular application. For example, cuboid and cube are usable. Of these, cube is preferable. The cuboid may partially chip. In terms of narrowing the degree of dispersion to pack particles more densely, cube having equal side length is preferable. The cuboid preferably has square or rectangle planes facing each other.

Each side of the bottom of the cuboid has no particular limit and can be suitably selected to suit to a particular application. For example, each side is preferably from 5 to 200 μm. The long side of each side is the longest side when one plane is set to be the bottom of a cuboid. When the cuboid is cube, it is one of the sides having an equal length of the bottom. The height of the cuboid has no particular limit and can be suitably selected to suit to a particular application. For example, each side is preferably from 5 to 200 μm. The height means the direction to the bottom of the cuboid.

In the present disclosure, the side forming the height between planes of the pillar-like form includes crushed state (barrel-like form in the case of pillar-like form) in which the resin softens at cutting. However, space appears between particles having arcs. Therefore, the side is preferably straight in terms of more dense packing of powder.

As the height of the pillar-like form, 50 percent cumulative volume particle diameter is preferably from 5 to 100 μm. In particular, collective entity of powder which is formed close to mono-dispersion is more preferable because it has uniform height with no deviation about the form and size. In the case of the significantly cylindrical form, it is preferable that the form have a diameter more nearly equal to the height in terms of reproducibility. Similarly, cube having equal height and side is preferable in the case of cuboid.

The resin powder for solid freeform fabrication is preferably constituted of only particles but it is suitable to mix with pulverized material.

The proportion of particle is preferably from 50 to 100 percent by mass, more preferably from 80 to 100 percent by mass, and furthermore preferably from 90 to 100 percent by mass to the total content of the resin powder for solid freeform fabrication. When the proportion is 50 to 100 percent by mass, it is possible to pack the particles more densely.

In the powder bed fusion (PBF) method, a large temperature difference (temperature window) about crystal layer change is preferable to prevent warping. It is preferable that the crystal layer change be larger because resin powder having a large difference between the melting starting temperature and the recrystallization point during cooling has better fabrication property. When multiple melting temperatures exist, the starting temperature on the lower temperature side is used.

Specific examples of the crystalline thermoplastic resin include, but are not limited to, polymers such as polyolefin, polyamide, polyester, polyarylketone, polyphenylene sulfide, a liquid crystal polymer (LCP), polyacetal (POM, melting point: 175 degrees C.), polyimide, and a fluorochemical resin. These can be used alone or in combination. The crystalline thermoplastic resin may include additives such as flame retardants, plasticizers, heat stabilizing agents, and crystal nucleating agents and polymer particles such as non-crystalline resins other than the polymers mentioned above. These can be used alone or in combination. The polymer particles can be mixed. Also, it is also possible to coat the surface of the polymer particle with the polymer particle.

Specific examples of the polyolefine include, but are not limited to, are polyethylene and polypropylene (PP, melting point: 180 degrees C.). These can be used alone or in combination.

Specific examples of the polyamide include, but are not limited to, polyamide 410 (PA410), polyanude 6 (PA6), polyamide 66 (PA66, melting point: 265 degrees C.), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T, melting point: 300 degrees C.), and polyanide 10T (PA10T).

These can be used alone or in combination. PA9T is also referred to as polynonamethylene terephthal amide constituted of a diamine having 9 carbon atoms and a terephthalic acid monomer. In general, since carbon acid side is an aromatic series, PA9T is referred to as semi-aromatic series. Moreover, aramid constituted of p-phenylenediamine and a terephathalic acid monomer as aromatic series in which diamine side is also aromatic is included as the polyamide in the present disclosure.

Specific examples of the polyester include, but are not limited to, polyethyleneterephthalate (PET), polybutadiene terephthalate (PBT, melting point: 218 degrees C.), and polylactic acid (PLA). To impart heat resistance, polyester partially including aromatic series including terephthalic acid and isophthalic acid is also suitably used in the present disclosure.

Specific examples of polyarylketone include, but are not limited to, polyether etherketone (PEEK, melting point: 343 degrees C.), polyetherketone (PEK), polyether ketone ketone (PEKK), polyaryl ether ketone (PAEK), polyether ether ketone ketone (PEEKK), and polyetherkeone ether ketone ketone (PEKEKK). In addition to the polyether mentioned above, crystalline polymers are also suitable.

Specific examples include, but are not limited to, polyacetal, polyimide, and polyether sulfone. It is also suitable to use polyamide having two melting peaks such as PA9T (it is necessary to raise the temperature of a resin to the second melting peak or higher to completely melt the resin).

The resin powder for solid freeform fabrication may furthermore optionally include, flowability increasing agent (fluidizer), toughening agent, antioxidant, and flame retardant.

The fluidizer partially or entirely covers the surface of the resin powder for solid freeform fabrication to improve flowability of the resin powder for solid freeform fabrication. If flowability of the resin powder for solid freeform fabrication increases, surface smoothness of the powder layer during recoating increases. In addition, voids in the resin powder for solid freeform fabrication are reduced, which makes it possible to further improve surface property, dimension accuracy, and strength of a solid freeform fabrication object. It is preferable that such fluidizer cover the surface of the resin powder. Some of them may be contained in the resin powder for solid freeform fabrication.

The average primary particle diameter of the fluidizer is preferably 500 nm or less and more preferably 50 nm or less. When the average primary particle diameter is 500 nm or less, the covering ratio of surface of the resin powder for solid freeform fabrication by fluidizer can be increased. Also, flowability is improved and voids can be reduced. The average primary particle diameter can be measured by, for example, a particle size measuring system (ELSZ-2000ZS, manufactured by OTSUKA ELECTRONICS Co., LTD.).

There is no specific limit to the fluidizer and it can be suitably selected to suit to a particular application. For example, spherical inorganic particles are preferable. In particular, metal oxide is preferable.

Specific examples include, but are not limited to, silica, alumina, titania, magnesium oxide, tin oxide, iron oxide, and copper oxide. These can be used alone or in combination.

Of these, silica and titania are preferable.

The fluidizer having a hydrophobized surface is preferably used.

There is no specific limit to the hydrophobizing method and known methods can be suitably selected.

Specific examples of the hydrophobizing agent for use in this hydrophobization treatment include, but are not limited to, silane coupling agents such as hexamethyl disilazane (HMDS) and dimethyldichlorosilane (DMDS) and silicone oil treating agent such as dimethyl silicone oil and amino-modified silicone oil. Of these, silane coupling agent are preferably used.

The processing amount of the hydrophobizing agent is preferably from 2 to 6 $mg/m^2$ for the surface area of particle.

Known powder mixers are used in the mixing and coating processes of the fluidizer with the resin powder for solid freeform fabrication. Mixers equipped with a jacket, etc. is preferably used to control the temperature of the inside. In addition, it is possible to arbitrarily change the number of rotation, speed, time, temperatures, etc. of the powder mixer.

Specific examples of the mixers include, but are not limited to, V-type mixers. Henschel Mixer, Rocking mixers, Nautor mixers, and Super mixers.

The proportion of the fluidizer is suitable when sufficient to cover the surface of particles and it is preferably from 0.05 to 10 percent by mass, more preferably from 0.05 to 3 percent by mass, and particularly preferably from 0.1 to 1.5 percent by mass to the total content of the resin powder for solid freeform fabrication. When the proportion is from 0.05 to 10 percent by mass, flowability of the resin powder for solid freeform fabrication can be improved and at the same time the impact of reduction of filling density ascribable to an increase of voids can be minimized.

Particulate inorganic material having a volume average particle diameter of less than 10µ can be the fluidizer.

Specific examples of the fluidizer include, but are not limited to, alumina, talc, glass-like silica, titania, hydrated silica, silica having a surface modified with a silane-coupling agent, and magnesium silicate.

In addition, in terms of preventing deterioration of the resin, it is preferable to add the antioxidant thereto. Examples of the antioxidant are hydrazine-based agents metal chelate, triadine based agents as ultraviolet absorber, hindered phenol-based agents as radical supplement agent, and phosphate-based and sulfur-containing agent as antioxidant. These can be used alone or in combination.

Fiber fillers, bead fillers, and articles disclosed in WTO 2008/057844 are suitable to improve the strength. These can be used alone or in combination.

The resin powder for solid freeform fabrication of the present disclosure is preferably dried suitably. Using a vacuum drier or silica gel is suitable to dry the resin powder before usage.

There is no specific limit to fiber filler and it can be suitably selected to suit to a particular application. For example, carbon fiber, inorganic glass fiber, and metal fiber are preferable.

There is no specific limit to bead filler and it can be suitably selected to suit to a particular application. For example, carbon bead, inorganic glass fiber, and metal bead are preferable.

In general, accuracy of fabricated objects tends to deteriorate if fiber filler or bead filler is mixed with resin powder for solid freeform fabrication having no sharp melting property. This is because since heat conductivity of fiber filler or bead filler to be added is higher than that of the resin powder for solid freeform fabrication, heat applied to the irradiated sites diffuses outside the irradiated sites when the powder surface is irradiated with laser beams during SLS fabrication so that the temperature of the resin powder outside the irradiation surpasses the melting point, which leads to excessive fabrication. Conversely, powder mixture of the resin powder for solid freeform fabrication of the present disclosure (which is the crystalline thermoplastic resin composition having sharp melting property), fiber filler, and bead filler are not easily melted even when the resin temperature outside laser irradiation rises due to heat diffusion because the resin powder has sharp melting property. Therefore, excessive fabrication can be prevented and high fabrication accuracy can be maintained.

In addition, the fiber filler preferably has an average fiber diameter of from 1 to 30 µm and an average fiber length of from 30 to 500 µm.

When fiber filler having an average fiber diameter or an average fiber length in such a range is used, strength of a fabricated object is improved and surface roughness of the fabricated object can be maintained on the same level as with a fabricated object having no fiber filler.

The bead filler preferably has a circularity of from 0.8 to 1.0 and a volume average particle diameter of from 10 to 200 µm.

The circularity is obtained by the following relation, where S represents an area (number of pixels) and L represents a perimeter.

Circularity=$4\pi S/L^2$

The volume average particle diameter can be measured by using a particle size distribution measuring instrument (Microtrac MT3300EXII, manufactured by MicrotracBEL Corp.).

The proportion of the fiber filler is preferably from 5 to 60 percent by mass to the total content of the resin powder for solid freeform fabrication. When the proportion is below this range, strength is not enhanced by this addition of fiber filler. When the proportion is above this range, fabrication becomes difficult.

The proportion of the bead filler is preferably from 5 to 60 percent by mass to the total content of the resin powder for solid freeform fabrication.

When the proportion is 5 percent by mass or greater, strength of a fabricated object is enhanced. When the proportion is 60 percent by mass or less, fabrication becomes easy.

Examples are halogen-based, phosphorus-based, inorganic hydrated metal compound-based, nitrogen-containing, silicone-containing retardants. These can be used alone or in combination. If two or more flame retardants are used in combination, the combination of halogen-based and inorganic hydrated metal compound-based retardants is preferable to improve flame retardancy.

Flame retardancy can be enhanced by adding inorganic toughening agents such as inorganic fibrous materials such as glass fiber, carbon fiber, aramid fiber and inorganic laminate silicate such as talc, mica, and montmorillonite. Inclusion of such material makes it possible to meet a balance between enhancing property and flame retardancy.

Flame retardancy of the resin powder for the solid freeform fabrication can be evaluated by, for example, JIS K6911, JS L1091 (ISO 6925), JIS C3005, and pyrogen test (using a cone calorimeter).

The proportion of the flame retardant is preferably from 1 to 50 percent by mass and more preferably from 10 to 30 percent by mass to the total content of the resin powder for solid freeform fabrication. When the proportion is 1 percent by mass or more, flame retardancy is sufficiently secured. In addition, when the proportion is 50 percent by mass or less, melt-solidification property of the resin powder for solid freeform fabrication does not change easily and it is possible to prevent deterioration of fabrication accuracy and properties.

The resin powder for solid freeform fabrication can be used in the SLS method or SMS method and has properties striking a balance between parameters such as particle size, particle size distribution, heat transfer properties, melt viscosity, bulk density, flowability, melting temperature, and recrystallization temperature.

To promote laser sintering degree in the PBF method, the bulk density of the resin powder for solid freeform fabrication is preferably large. For example, it is preferably 0.30 g/mL or greater, more preferably 0.35 g/mL or greater, and particularly preferably 0.40 g/mL or greater.

A fabricated object formed by laser sintering using the resin powder for solid freeform fabrication is smooth and has a surface having a resolution sufficient to indicate minimum orange peel or less.

The orange peel means surface deficiency such as unsuitable coarse surface or voids or warping on the surface of a fabricated object formed by laser sintering in the PBF method in general. The void has a significant impact on aesthetic appearance and mechanical strength.

Furthermore, it is preferable that solid freeform fabrication objects formed by laser sintering using the resin powder for solid freeform fabrication be free of unsuitable process properties such as warping and distortion due to phase changes and fuming during sintering until cooling after sintering.

The resin powder for solid freeform fabrication of the present disclosure has excellent recyclability. Also, solid freeform fabrication objects formed of fresh powder by the PBF method are free of (a) orange peel and (b) significant deterioration in mechanical performance (10 percent or more deterioration in tensile strength).

After the recycled powder for use in the present disclosure is tested at least once, preferably five times, more preferably seven times, and particularly preferably at least ten times according to the recycling method described in the test method according to ISO 3167 Type 1A, a dog-bone-like test specimen for multiple purposes having a length of 150 mm free of (a) and (b) mentioned above can be manufactured by a manufacturing device employing PBF method (AM S5500P, manufactured by Ricoh Company Ltd.).

The resin powder for solid freeform fabrication can be obtained by typical pulverization method. For example, the powder is obtained by pulverizing pellets, etc. at room temperature using a pulverizer. The obtained powder is subject to classification using a filter to remove particles having a diameter outside the target. It is preferable that the powder be obtained by pulverization at low temperatures of 0 degrees C. or below (not higher than the brittleness temperature of each resin), more preferably −25 degrees C. or below, and particularly preferably at extremely low temperatures of −100 degrees C. or below utilizing resin brittleness.

As described above, it is preferable to conduct improving crystallization before or after pulverization.

Specific examples of the pulverizer suitably used for pulverization include, but are not limited to, pin mills, counter jet mills, and baffle plate impact pulverizers.

The resin powder for solid freeform fabrication can also be obtained by extending pellets, etc. several times to obtain fiber having a size of several tens µm to several hundreds 10 µm and cutting the fiber with laser cutting or blades so that the fiber has a size of several µm to several hundreds µm. Both methods can be used in combination. Melted resin for solid freeform fabrication is extruded in fibrous form by an extruder during stirring at temperatures 30 degrees C. or greater higher than the melting point. The melted resin for solid freeform fabrication is extended to around 1/1 to around 1/10 (ten times) to obtain fiber. The form of the cross section of the fiber can be determined by the form of the nozzle mouth of the extruder. In the present disclosure, when the particle form is a significantly cylindrical form, the nozzle mouth is preferably circular. When the particle form is a cuboid, the nozzle mouth is preferably a cuboid or square form. Productivity increases in proportion to the number of nozzles. The maximum extension ratio can be changed depending on resin and melt viscosity.

After the pulverization, it is preferable to spheroidizing resin powder to round angular angles thereof. The resin powder can be spheroidized by a solvent to dissolve the resin powder or a spherical stirrer while heat is applied.

It is preferable to conduct sintering every time a new powder layer is pressed by a roller to fabricate a solid freeform object from the resin powder for solid freeform fabrication of the present disclosure.

In the sintering process, the powder layer portion is selectively melted. The new powder layer is formed on the previously formed layer and selectively melted again. This operation is repeated until a target solid freeform fabrication object is manufactured.

The resin powder for solid freeform fabrication is typically melted by electromagnetic wave irradiation. The resin powder is selectively melted by, for example, retardants, absorbents, or electromagnetic wave irradiation (for example, by masking or direct laser beams).

There is no specific limit to selections of electromagnetic wave irradiation sources. For example, $CO_2$ laser, infra red irradiation source, microwave generators, radiant heaters. LED lamps, and combinations thereof are usable.

In some embodiments, solid freeform fabrication objects of the present disclosure can be manufactured using selective mask sintering (SMS) technologies. The SMS process is described in, for example, U.S. Pat. No. 6,531,086.

In the SMS process, powder layers are partially and selectively irradiated with infra red while being selectively shielded by using a shielding mask. When utilizing the SMS process to manufacture an article from the resin powder for solid freeform fabrication of the present disclosure, it is preferable to contain at least one kind of material to enhance infrared absorption of the resin powder for solid freeform fabrication. The resin powder for solid freeform fabrication may contain at least one kind of heat absorbent and/or dark color material (such as carbon fiber, carbon black, carbon nanotube, and cellulose nanofiber).

To manufacture a solid freeform fabrication object by the PBF method using the resin powder for solid freeform fabrication of the present disclosure, it is preferable to laminate multiple layers containing polymer matrix and attached sintered layers.

The sintered layer preferably has a thickness suitable for the fabrication process.

The average thickness of the multiple sintered layers is preferably 10 μm or greater, more preferably 50 μm or greater, and particularly preferably 100 μm or greater. The average thickness of the multiple sintered layers is preferably less than 200 μm, more preferably less than 150 μm, and particularly preferably less than 120 μm.

The resin powder for solid freeform fabrication of the present disclosure can be suitably used to form articles used as prototypes of electronic device parts, vehicle parts, and prototypes for strength test, and low volume products for use in aerospace or dress up tools for the auto industry. Methods other than the PBF method are expected to manufacture objects having excellent strength in comparison with FDM and inkjet, so that objects manufactured by such methods can be practically used.

The production speed is not on par with mass production of injection molding, etc. However, for example, it is possible to obtain required amount of production by manufacturing a massive amount of small parts in a two-dimensional manner.

In addition, the method of manufacturing a solid freeform fabrication object by PBF method for use in the present disclosure obviates the need for dies unlike injection molding. Therefore, overwhelming cost reduction and short delivery time are achieved in the case of manufacturing prototypes if utilizing this method.

Method of Manufacturing Solid Freeform Fabrication Object and Device for Manufacturing Solid Freeform Fabrication Object The method of manufacturing a solid freeform fabrication object of the present disclosure includes forming a layer containing the resin powder for solid freeform fabrication of the present disclosure, applying electromagnetic wave to the formed layer to melt it, cooling down the melted layer to cure it, and repeating the film forming, applying, and cooling down. The method may furthermore optionally include other processes.

The device for manufacturing a solid freeform fabrication object includes a layer forming device to form a layer including the resin powder for solid freeform fabrication object of the present disclosure and a powder attaching device to attach resin powder to each other in a selected area of the layer and may furthermore optionally include other devices.

The method of manufacturing a solid freeform fabrication object of the present disclosure can be suitably executed by the device for manufacturing a solid freeform fabrication object.

An example of the powder attaching device is a curing device that irradiates levelized powder with electromagnetic wave or laser beams to melt and cool down the resin powder for curing.

Examples of the electromagnetic wave generator for use in electromagnetic wave irradiation are $CO_2$ laser, infra red irradiation source, microwave generators, radiant heaters, LED lamps, and combinations thereof are usable.

Figure 2:
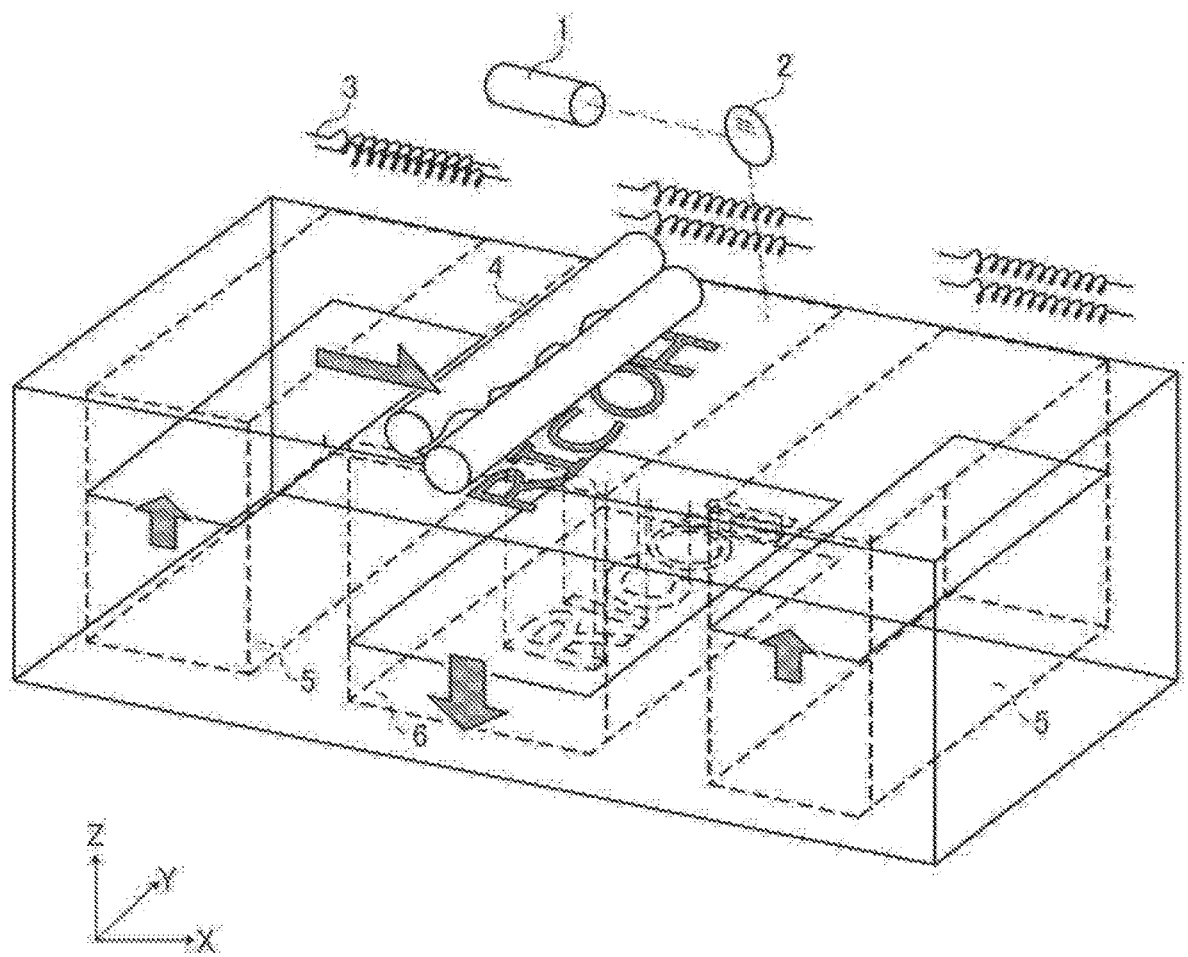
FIG. 2 is a schematic diagram illustrating an example of the device for manufacturing a solid freeform fabrication object (three-dimensional object) according to an embodiment of the present invention.

The device for manufacturing a solid freeform fabrication object is described referring to FIG. 2.

FIG. 2 is a schematic diagram illustrating an example of the device for manufacturing a solid freeform fabrication object for use in the method of manufacturing a solid freeform fabrication object of the present disclosure. As illustrated in FIG. 2, powder is stored in a supplying tank 5 for powder and supplied to a laser scanning space 6 using a roller 4 in proportion to the usage amount. It is preferable that the temperature of the supplying tank 5 be controlled by a heater 3. The laser scanning space 6 is irradiated with the laser beams emitted from an electromagnetic wave irradiation source 1 using a reflection mirror 2. The powder is sintered by the heat of the laser beams to obtain a solid freeform fabrication object.

The temperature of the supplying tank 5 is preferably at least 10 degrees C. or more lower than the melting point of the powder.

The temperature of the part bed in the laser scanning space 6 is preferably 5 degrees C. or more lower than the melting point of the powder.

The power of the laser has no particular limit and can be suitably selected to suit to a particular application. For example, it is preferably from 10 to 150 W.

Solid Freeform Fabrication Object

The solid freeform fabrication object can be suitably manufactured by the method of manufacturing a solid freeform fabrication object of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

50 percent cumulative volume particle diameter, volume average particle diameter (Mv), number average particle diameter (Mn), average circularity, melting point, measuring of melting starting temperature of Condition 1 according to differential scanning calorimetry, measuring of crystallinity of Condition 2 according to differential scanning calorimetry, crystallinity, and measuring of crystallinity of Condition 3 by X-ray analyzer were measured in the following manner.

The results are shown in Tables 1 and 2.

50 Percent Cumulative Volume Particle Diameter, Volume Average Particle Diameter (Mv), and Number Average Particle Diameter (Mn)

The 50 percent cumulative volume particle diameter, the volume average particle diameter, and the number average particle diameter were measured by using a particle size distribution measuring instrument (Microtrac MT3300EXII, manufactured by MicrotracBEL Corp.) employing a drying process (atmosphere) method without using a solvent, utilizing particle refractive index per resin powder. The particle refractive index was set for polybutylene terephthalate (PBT) resin of 1.57, polyamide 66 (PA66) resin of 1.53, polyamide 9T (PA9T) resin of 1.53, polypropylene (PP) resin of 1.48, polyether ether ketone (PEEK) resin of 1.57, and polyacetal (POM) resin of 1.48. The ratio (Mv/Mn) of the volume average particle diameter to the number average particle diameter was calculated from the thus-obtained volume average particle diameter and the number average particle diameter.

Average Circularity

The average circularity was measured by a wet-process flow type particle size/form analyzer (FPIA-3000, manufactured by SYSMEX CORPORATION).

Melting Point

The melting point can be measured according to ISO 3146 (Testing Methods for Transition Temperatures of Plastics, JIS K7121) using a differential scanning calorimetry (DSC).

Measuring Method of Dissolution Starting Point of Condition 1 According to Differential Scanning Calorimetry Measuring According to the measuring method of ISO 3146 (Testing Methods for Transition Temperatures of Plastics. JIS K7121), a differential scanning calorimeter (DSC-60A, manufactured by Shimadzu Corporation) was used to measure the melting starting temperature (Tmf1) of the endothermic peak as the resin powder was heated to the temperature 30 degrees C. higher than the melting point thereof for the first time at a temperature rising speed of 10 degrees C. per minute. Thereafter, the resin powder was cooled down to −30 degrees C. or lower at a temperature falling speed of 10 degrees C. per minute and heated to the temperature 30 degrees C. higher than the melting point for the second time at a temperature rising speed of 10 degrees C. per minute to measure the melting starting temperature (Tmf2) of the endothermic peak. The melting starting temperature of the endothermic peak represents a temperature at a point −15 mW lower from a straight line parallel to X axis drawn from a site where quantity of heat becomes constant after endotherm at the melting point is finished to the lower temperature side.

PBT of Examples 1 to 3 and Comparative Examples 1 to 3, PA66 of Example 4 and Comparative Example 4, PP of Example 6 and Comparative Example 6, PEEK of Example 7 and Comparative Example 7, and POM of Example 8 and Comparative Example 8 have clear melting points. Therefore, crystallinity was obtained by DSC.

Since PA9T of Example 5 and Comparative Example 5 has no clear melting peak, it was not possible to obtain the melting starting temperature.

Measuring Method of Crystallinity of Condition 2 According to Differential Scanning Calorimetry Measuring The measuring method of crystallinity of the condition (2) of differential scanning calorimetry (DSC) is based on the measuring method according to ISO 3146 (Testing Methods for Transition Temperatures of Plastics, JIS K7121). The energy amount (heat amount of melting) of an endothermic peak when heated to the temperature 30 degrees C. higher than the melting point of powder resin at a temperature rising speed of 10 degrees C. per minute was measured to obtain crystallinity (Cd1) from the heat amount of melting to the heat amount of perfect crystallization. Thereafter, the resin powder is cooled down to −30 degrees C. or lower at a temperature falling speed of 10 degrees C. per minute and heated to the temperature 30 degrees C. higher than the melting point at a temperature rising speed of 10 degrees C. per minute to measure the energy amount of the endothermic peak so that crystallinity (Cd2) can be obtained from the heat amount of melting to the heat amount of perfect crystallization.

Measuring Method of Crystallinity of Condition 3 According to X-Ray Analyzer

Crystallinity of resin powder of the condition 3 was obtained by measuring crystallinity (Cx1) of the resin powder placed on a glass plate by an X-ray analyzer including a two-dimensional detector (Discover 8, manufactured by Bruker) at a 2θ range of from 10 to 40 at room temperature. Next, in the DSC, in a nitrogen atmosphere, the resin was heated to 30 degrees C. higher than the melting point thereof at a temperature rising speed of 10 degrees C. per minute. The temperature was kept for 10 minutes, cooled down to −30 degrees C. at a temperature falling speed of 10 degrees C. per minute, and thereafter the temperature of the sample (resin powder) was returned to room temperature. Crystallinity (Cx2) was measured in the same manner as with Cx1.

Example 1

98.5 percent by mass of polybutylene terephthalate (PBT) resin (NOVADURAN® 5020, melting point: 218 degrees C., glass transition temperature: 43 degrees C., manufactured by Mitsubishi Engineering-Plastics Corporation) was extruded by an extruder and stirred at the temperature 30 degrees C. higher than the melting point. Thereafter, 0.5 percent by mass of phenol-based antioxidant (AO-80, manufactured by ADEKA CORPORATION) and 1.0 percent by mass of phosphate-based antioxidant (PEP-36, manufactured by ADEKA CORPORATION) were admixed with the resultant. The mixture was cut to about 1 mm by a pelletizer followed by frost shattering at −200 degrees C. to obtain powder. The thus-obtained powder was pulverized until the size ranged from 5 to 100 μm. The 50 percent cumulative volume particle diameter was from 20 to 90 μm. The obtained powder was subject to annealing under the following condition to obtain controlled crystalline thermoplastic resin powder.

Conditions of Annealing

The thus-obtained powder was heated at the temperature 50 degrees higher than the glass transition temperature thereof for three days to increase crystallinity and thereafter slowly cooled down to room temperature. Sampling was conducted in the middle to check crystallinity, Comparative Example 1

Thermoplastic resin powder was obtained in the same manner as in Example 1 except that annealing for crystallization was not conducted.

Example 2

Controlled thermoplastic resin powder was obtained in the same manner as in Example 1 except that annealing for crystallization was changed to the extension under the following condition.
Conditions of Extension Obtained powder was stirred at the temperature 30 degrees C. higher than the melting point by an extruder and thereafter extruded and extended to obtain a melted resin for solid freeform fabrication in a fibrous resin. Each of the resin was extended to 1.5 to 10 times to obtain the fibrous resin and thereafter directly cut to 0.07 mm or less.

Example 3

Controlled thermoplastic resin powder was obtained in the same manner as in Example 1 except that annealing for crystallization was changed to the ultrasonic wave under the following condition.
Condition of Ultrasonic Wave Glycerin (reagent grade, manufactured by Tokyo Chemical Industry Co. Ltd.) solvent was added to resin powder in an amount of five times as much as the resin followed by heating to the temperature 20 degrees C. higher than the melting point. Thereafter, ultrasonic wave was applied thereto by an ultrasonic wave generator (ultrasonicator UP200S, manufactured by Hielscher Ultrasonics GmbH) at a frequency of 24 KHz and an amplitude of 60 percent for two hours. Thereafter, the resultant was rinsed with a solvent of isopropanol at room temperature and subject to vacuum drying.

Comparative Example 2

Thermoplastic resin powder was obtained in the same manner as in Example 2 except that fiber was obtained without the extension treatment and directly cut 0.07 mm or less.

Comparative Example 3

Thermoplastic resin powder was obtained in the same manner as in Example 2 except that the extension ratio of the fiber was changed to 1.05 times.

Example 4

Controlled crystalline thermoplastic resin powder was obtained in the same manner as in Example 2 except that polybutylene terephthalate (PBT) resin was changed to polyamide 66 (PA66) resin (Leona™ 1300S, melting point, 265 degrees C. manufactured by Asahi Kasei Chemicals Corporation).

Comparative Example 4

Thermoplastic resin powder was obtained in the same manner as in Example 4 except that extension for crystallization was not conducted.

Example 5

Controlled crystalline thermoplastic resin powder was obtained in the same manner as in Example 2 except that polybutylene terephthalate (PBT) resin was changed to polyamide 9T (PA9T) resin (Genestar™ N1000A, melting point: 300 degrees C., manufactured by KURARAY CO., LTD.).

Comparative Example 5

Thermoplastic resin powder was obtained in the same manner as in Example 5 except that extension for crystallization was not conducted.

Example 6

Controlled crystalline thermoplastic resin powder was obtained in the same manner as in Example 1 except that polybutylene terephthalate (PBT) resin was changed to polypropylene (PP) resin (NOVATEC™ MA3, melting point: 180 degrees C., glass transition temperature: 0 degrees C., manufactured by JAPAN POLYPROPYLENE CORPORATION).

Comparative Example 6

Thermoplastic resin powder was obtained in the same manner as in Example 6 except that annealing for crystallization was not conducted.

Example 7

Controlled crystalline thermoplastic resin powder was obtained in the same manner as in Example 1 except that polybutylene terephthalate (PBT) resin was changed to polyetherether ketone (PEEK) resin (HT P22PF, melting point: 343 degrees C., glass transition temperature: 143 degrees C., manufactured by VICTREX).

Comparative Example 7

Thermoplastic resin powder was obtained in the same manner as in Example 7 except that annealing for crystallization was not conducted.

Example 8

Controlled crystalline thermoplastic resin powder was obtained in the same manner as in Example 3 except that polybutylene terephthalate (PBT) resin was changed to polyacetal (POM) resin (Jupital® F10-01, melting point: 175 degrees C., manufactured by Mitsubishi Engineering-Plastics Corporation).

Comparative Example 8

Thermoplastic resin powder was obtained in the same manner as in Example 8 except that application of ultrasonic wave for crystallization was not conducted.

Accuracy, recyclability, and initial tensile strength were evaluated for those obtained resin powders. The results are shown in Table 2.

Accuracy

A solid freeform fabrication object was manufactured by an SLS method fabrication device (AM S5500P, manufactured by Ricoh Company, Ltd.) using the obtained resin powder (resin powder for solid freeform fabrication). The conditions were: average layer thickness of 0.1 mm, a laser output of from 10 to 150 W, a laser scanning space of 0.1 mm, and a part bed temperature of 3 degrees C. above or below the melting point. The temperature of the supplying tank was set to 10 degrees C. below the melting point. Based on data such as CAD of a cuboid solid freeform fabrication object (sample for dimension) having a side of 5 cm and an average thickness of 0.5 cm, the sample for dimension (mm) was manufactured. The difference between the CAD data of the sample for dimension and the length of each side of the fabricated (manufactured) sample was obtained. The average of the differences was defined as dimensional error to evaluate accuracy.

Recyclability 10 kg of powder was loaded in the supplying bed of an SLS method fabrication device (AM S5500P, manufactured by Ricoh Company, Ltd.) to evaluate the recyclability of the resin powder in the SLS process. The conditions of the SLS method fabrication device were the same as those for the evaluation on accuracy. From the powder, the long side of five tensile test specimens was (a) aligned to the direction of Y axis and a fabricated object was arranged in the center of fabricated layers. The gap between each fabrication layer was 5 mm. Next, (b) a cuboid (mm) having aside of 5 cm and an average thickness of 0.5 cm was manufactured. As the tensile test specimen, a multi-purpose dog-bone-like test specimen (specimen having a center portion of a length of 80 mm, a thickness of 4 mm, and a width of 10 mm) having a length of 150 mm of ISO 3167 Type 1A was used. The powder used for fabrication was returned to the supplying bed, used for the fabrication as described above, and returned to the supplying bed. This fabrication operation was repeated 10 times. The thus-obtained solid freeform fabrication object was subject to the tensile test according to ISO 527 by a tensile tester (AGS-5 kN, manufactured by Shimadzu Corporation) to evaluate recyclability based on the following evaluation criteria. The test speed in the tensile test was constant at 50 mm/minute. The maximum stress was determined as the tensile strength. The solid freeform fabrication object for the first time was subject to the test five times. The initial value of mechanical strength is the average of the obtained five measuring values.

Evaluation Criteria

A: No warping observed for solid freeform fabrication object fabricated for the tenth time and the deterioration rate of the mechanical strength was 30 percent or less in comparison with the initial value B. No warping observed for solid freeform fabrication object fabricated for the tenth time and the deterioration rate of the mechanical strength was greater than 30 percent in comparison with the initial value.

Initial Tensile Strength

Using the same device and conditions as with manufacturing of the sample for evaluation on accuracy, (a) five tensile test specimens were fabricated at the center with the long side aligned to the direction of Y axis in the longitudinal direction of the tensile test specimen. The gap between each fabrication layer was 5 mm. Next, (b) a cuboid having a side of 50 mm and an average thickness of 5 mm was manufactured. As the tension test specimen, a multi-purpose dog-bone-like test specimen (specimen having a center portion of a length of 80 mm, a thickness of 4 mm, and a width of 10 mm) having a length of 150 mm of ISO 3167 Type 1A was used.

The thus-obtained solid freeform fabrication object was subject to the tension test according to ISO 527 by a tension tester (AGS-5 kN, manufactured by Shimadzu Corporation) to measure the initial tensile strength of the obtained solid freeform fabrication object. The test speed in the tensile test was constant at 50 mm/minute. The solid freeform fabrication object for the first time was subject to the test five times. The initial value of tensile strength is the average of the obtained five measuring values.

TABLE 1

| | Powder | | | Condition 1 | | |
|---|---|---|---|---|---|---|
| | Kind | Melting point (degrees C.) | Crystallization method | Tmf1 (degrees C.) | Tmf2 (degrees C.) | Heat amount of perfect crystal (J/g) |
| Comparative Example 1 | PBT | 218 | None | 208 | 209 | −1 |
| Example 1 | PBT | 218 | annealing | 213 | 210 | 3 |
| Comparative Example 2 | PBT | 218 | non-extended | 210 | 209 | 1 |
| Comparative Example 3 | PBT | 218 | extension | 212 | 210 | 2 |
| Example 2 | PBT | 218 | extension | 218 | 210 | 8 |
| Example 3 | PBT | 218 | ultrasonic wave | 220 | 209.5 | 10.5 |
| Comparative Example 4 | PA66 | 265 | None | 232 | 232 | 0 |
| Example 4 | PA66 | 265 | extension | 250 | 232 | 18 |
| Comparative Example 5 | PA9T | 300 | None | — | — | — |
| Example 5 | PA9T | 300 | extension | — | — | — |
| Comparative Example 6 | PP | 180 | None | 106 | 107 | −1 |
| Example 6 | PP | 180 | annealing | 112.5 | 107.3 | 5.2 |
| Comparative Example 7 | PEEK | 343 | None | 317 | 320 | −3 |
| Example 7 | PEEK | 343 | annealing | 326 | 320 | 6 |
| Comparative Example 8 | POM | 175 | None | 149 | 150 | −1 |
| Example 8 | POM | 175 | ultrasonic wave | 157 | 151 | 6 |

| | Powder | | | Condition 2 | | | | | |
|---|---|---|---|---|---|---|---|---|---|
| | | | | Heat | Cd1 | | Cd2 | | |
| | | Melting point (degrees | Crystal- lization | amount of perfect crystal- | Heat amount of melting | Crystal- linity | Heat amount of melting | Crystal- linity | Cd1- Cd2 |
| | Kind | C.) | method | lization | (J/g) | (percent) | (J/g) | (percent) | (percent) |
| Comparative Example 1 | PBT | 218 | None | 145 | 42 | 29 | 42 | 29 | 0 |
| Example 1 | PBT | 218 | annealing | 145 | 56 | 39 | 42 | 29 | 10 |
| Comparative Example 2 | PBT | 218 | non-extended | 145 | 30 | 21 | 33 | 23 | −2 |
| Comparative Example 3 | PBT | 218 | extension | 145 | 37 | 26 | 35 | 24 | 1 |
| Example 2 | PBT | 218 | extension | 145 | 60 | 41 | 43 | 30 | 12 |
| Example 3 | PBT | 218 | ultrasonic wave | 145 | 61 | 42 | 45 | 31 | 11 |
| Comparative Example 4 | PA66 | 265 | None | 226 | 77 | 34 | 77 | 34 | 0 |
| Example 4 | PA66 | 265 | extension | 226 | 127 | 56 | 77 | 34 | 22 |
| Comparative Example 5 | PA9T | 300 | None | — | — | — | — | — | — |
| Example 5 | PA9T | 300 | extension | — | — | — | — | — | — |
| Comparative Example 6 | PP | 180 | None | 209 | 48 | 23 | 48 | 23 | 0 |
| Example 6 | PP | 180 | annealing | 209 | 63 | 30 | 48 | 23 | 7 |
| Comparative Example 7 | PEEK | 343 | None | 130 | 20 | 15 | 20 | 15 | 0 |
| Example 7 | PEEK | 343 | annealing | 130 | 27 | 21 | 20 | 15 | 6 |
| Comparative Example 8 | POM | 175 | None | — | — | — | — | — | — |
| Example 8 | POM | 175 | ultrasonic wave | — | — | — | — | — | — |

| | Powder | | | Condition 3 | | |
|---|---|---|---|---|---|---|
| | | Melting point (degrees | Crystal- lization | C × 1 Crystal- linity | C × 2 Crystal- linity | CB1- CB2 |
| | Kind | C.) | method | (percent) | (percent) | (percent) |
| Comparative Example 1 | PBT | 218 | None | 30 | 30 | 0 |
| Example 1 | PBT | 218 | annealing | 39 | 30 | 9 |
| Comparative Example 2 | PBT | 218 | non-extended | 31 | 30 | 1 |
| Comparative Example 3 | PBT | 218 | extension | 34 | 32 | 2 |
| Example 2 | PBT | 218 | extension | 41 | 30 | 11 |
| Example 3 | PBT | 218 | ultrasonic wave | 40 | 30 | 10 |
| Comparative Example 4 | PA66 | 265 | None | 34 | 34 | 0 |
| Example 4 | PA66 | 265 | extension | 56 | 36 | 20 |
| Comparative Example 5 | PA9T | 300 | None | 21 | 21 | 0 |
| Example 5 | PA9T | 300 | extension | 31 | 22 | 9 |
| Comparative Example 6 | PP | 180 | None | — | — | — |
| Example 6 | PP | 180 | annealing | — | — | — |
| Comparative Example 7 | PEEK | 343 | None | — | — | — |
| Example 7 | PEEK | 343 | annealing | — | — | — |
| Comparative Example 8 | POM | 175 | None | 43 | 43 | 0 |
| Example 8 | POM | 175 | ultrasonic wave | 67 | 43 | 24 |

TABLE 2

| | Resin powder for solid freeform fabrication | | | Evaluation Results | | |
|---|---|---|---|---|---|---|
| | Average Circularity | 50 percent cumulative volume particle diameter (μm) | Average Circularity | Recyclability | Accuracy (mm) | Initial Tensile Strength (MPa) |
| Comparative Example 1 | 0.76 | 65 | 1.49 | B | 0.20 | 44 |
| Example 1 | 0.73 | 68 | 1.49 | A | 0.05 | 43 |
| Comparative Example 2 | 0.74 | 65 | 1.89 | B | 0.21 | 43 |
| Comparative Example 3 | 0.76 | 65 | 1.99 | B | 0.17 | 43 |
| Example 2 | 0.82 | 60 | 1.15 | A | 0.01 | 57 |
| Example 3 | 0.71 | 64 | 1.49 | A | 0.05 | 42 |
| Comparative Example 4 | 0.79 | 51 | 1.59 | B | 0.18 | 59 |
| Example 4 | 0.8 | 52 | 1.17 | A | 0.01 | 83 |
| Comparative Example 5 | 0.8 | 72 | 4.45 | B | 0.17 | 155 |
| Example 5 | 0.81 | 75 | 1.17 | A | 0.01 | 165 |
| Comparative Example 6 | 0.8 | 40 | 1.39 | B | 0.21 | 31 |
| Example 6 | 0.8 | 45 | 1.39 | A | 0.05 | 31 |
| Comparative Example 7 | 0.71 | 21 | 1.60 | B | 0.42 | 53 |
| Example 7 | 0.7 | 24 | 1.49 | A | 0.07 | 240 |
| Comparative Example 8 | 0.65 | 10 | 3.37 | B | 0.20 | 60 |
| Example 8 | 0.62 | 15 | 1.49 | A | 0.05 | 69 |

In addition, flame retardant was added in Example 2 or 4 as described in Examples 9 to 17 to obtain resin powder for solid freeform fabrication. The results are shown in Table 3. Examples 2 and 4 are shown in Table 3 for comparison.

Example 9

Controlled crystalline thermoplastic resin powder was obtained in the same manner as in Example 2 except that halogen (bromine)-based flame retardant ("NONNEN" PR-2H, manufactured by Marubishi Oil Chemical Corporation) was added in an amount of 30 percent by mass when the PBT resin was charged in the extruder.

Example 10

Controlled crystalline thermoplastic resin powder was obtained in the same manner as in Example 2 except that phosphorus-based flame retardant ("NONNEN" 75, manufactured by Marubishi Oil Chemical Corporation) was added in an amount of 30 percent by mass when the PBT resin was loaded in the extruder.

Example 11

Controlled crystalline thermoplastic resin powder was obtained in the same manner as in Example 2 except that halogen (bromine)-based flame retardant ("NONNEN" PR-2H, manufactured by Marubishi Oil Chemical Corporation) was added in an amount of 10 percent by mass when the PBT resin was loaded in the extruder.

Example 12

Controlled crystalline thermoplastic resin powder was obtained in the same manner as in Example 2 except that halogen (bromine)-based flame retardant ("NONNEN" PR-2H, manufactured by Marubishi Oil Chemical Corporation) was added in an amount of 0.9 percent by mass when the PBT resin was loaded in the extruder.

Example 13

Controlled crystalline thermoplastic resin powder was obtained in the same manner as in Example 2 except that halogen (bromine)-based flame retardant ("NONNEN" PR-2H, manufactured by Marubishi Oil Chemical Corporation) was added in an amount of 50 percent by mass when the PBT resin was loaded in the extruder.

Example 14

Controlled crystalline thermoplastic resin powder was obtained in the same manner as in Example 2 except that inorganic hydrated metal compound-based (anthimony trioxide) flame retardant (PATOX-L, manufactured by Nihon Seiko Co., LTD.) was added in an amount of 30 percent by mass when the PBT resin was loaded in the extruder.

Example 15

Controlled crystalline thermoplastic resin powder was obtained in the same manner as in Example 2 except that halogen (bromine)-based flame retardant ("NONNEN" PR-2H, manufactured by Marubishi Oil Chemical Corporation) in an amount of 10 percent by mass and inorganic hydrated metal compound-based (antimony trioxide) flame retardant (PATOX-L, manufactured by Nihon Seiko Co., LTD.) in an amount of 10 percent by mass were added when the PBT resin was loaded in the extruder.

Example 16

Controlled crystalline thermoplastic resin powder was obtained in the same manner as in Example 4 except that halogen (bromine)-based flame retardant ("NONNEN" PR-2H, manufactured by Marubishi Oil Chemical Corporation) was added in an amount of 30 percent by mass when the PA66 resin was loaded in the extruder.

Example 17

Controlled crystalline thermoplastic resin powder was obtained in the same manner as in Example 4 except that halogen (bromine)-based flame retardant ("NONNEN" PR-2H, manufactured by Marubishi Oil Chemical Corporation) in an amount of 10 percent by mass and inorganic hydrated metal compound-based (antimony trioxide) flame retardant (PATOX-L, manufactured by Nihon Seiko Co., LTD.) in an amount of 10 percent by mass were added when the PA66 resin was loaded in the extruder.

Accuracy, recyclability, and initial tensile strength were evaluated for those obtained resin powders in the same manner as in Example 1. Flame retardancy was evaluated as follows. The results are shown in Table 3.

Flame Retardancy 5.0 g of the obtained resin powder for solid freeform fabrication was placed flat on a circular stainless steel mesh (TESTING SIEVE, manufactured by TOKYO SCREEN CO., LTD.) having an opening of 25 μm and a diameter of 10 cm and directly heated from below by a burner. The ignition state was evaluated according to the following criteria.

Evaluation Criteria

A: No ignition after heating for 60 seconds
B: Time to be taken from start of heating until ignition was from 40 to less than 60 seconds
C: Time to be taken from start of heating until ignition was from 20 to less than 40 seconds
D: Time to be taken from start of heating until ignition was less than 20 seconds

TABLE 3

| | | | Resin powder for solid freeform fabrication | | | | | |
|---|---|---|---|---|---|---|---|---|
| | | | Flame retardant | | | | 50 percent cumulative | | |
| | Kind | Kind | Kind | Content (percent by mass) | Average circularity | Melting point (degrees C.) | volume particle diameter (μm) | Mv/Mn | Evaluation Results Flame Retardancy |
| Example 2 | Example 2 | PBT | — | — | 0.82 | 218 | 60 | 1.15 | D |
| Example 9 | Example 2 | PBT | "Nonnene" PR-2H | 30 | 0.82 | 218 | 60 | 1.15 | A |
| Example 10 | Example 2 | PBT | "Nonnene" 75 | 30 | 0.82 | 218 | 60 | 1.15 | A |
| Example 11 | Example 2 | PBT | "Nonnene" PR-2H | 10 | 0.82 | 218 | 60 | 1.15 | A |
| Example 12 | Example 2 | PBT | "Nonnene" PR-2H | 0.9 | 0.82 | 218 | 60 | 1.15 | B |
| Example 13 | Example 2 | PBT | "Nonnene" PR-2H | 50 | 0.82 | 218 | 60 | 1.15 | A |
| Example 14 | Example 2 | PBT | PATOX-L | 30 | 0.82 | 218 | 60 | 1.15 | A |
| Example 15 | Example 2 | PBT | "Nonnene" PR-2H PATOX-L | 10 10 | 0.82 | 218 | 60 | 1.15 | A |
| Example 4 | Example 4 | PA66 | — | — | 0.8 | 265 | 52 | 1.17 | D |
| Example 16 | Example 4 | PA66 | "Nonnene" PR-2H | 30 | 0.8 | 265 | 52 | 1.17 | A |
| Example 17 | Example 4 | PA66 | "Nonnene" PR-2H PATOX-L | 10 10 | 0.8 | 265 | 52 | 1.17 | A |

The values of the conditions 1 to 3 in Examples 9 to 17 are the same as the values of Example 2 or 4 as the resin powder for solid freeform fabrication. In addition, the evaluation results of recyclability, accuracy, and initial tensile strength are the same as those of Example 2 or 4.

Example 18

Carbon fiber (TORAYCA® milled fiber, manufactured by Toray Industries, Inc.) was added in an amount of 60 percent by mass as a filler to the PBT resin powder treated with annealing manufactured in Example 1. The mixture was mixed in dry process for 30 minutes by a screw mixer (mixing stirrer DM type, manufactured by DALTON CORPORATION) to obtain resin powder for solid freeform fabrication. The carbon fiber added had an average fiber diameter of 7 μm and an average fiber length of 130 μm.

Example 19

Aluminum fiber (melted spinning aluminum fiber, manufactured by AKAO Aluminum Corp.) was added in an amount of 30 percent by mass as a toughening agent (filler) to the PBT resin powder treated with extension manufactured in Example 2. The mixture was mixed in dry process for 30 minutes by a screw mixer (mixing stirrer DM type, manufactured by DALTON CORPORATION) to obtain resin powder for solid freeform fabrication. The fiber added had an average fiber diameter of 7 μm and an average fiber length of 130 μm.

Example 20

Glass fiber (Milled Fiber, manufactured by Nippon Electric Glass Co., Ltd.) was added in an amount of 5 percent by mass as a filler to the PBT resin powder treated with ultrasonic wave manufactured in Example 3. The mixture was mixed in dry process for 30 minutes by a screw mixer (mixing stirrer DM type, manufactured by DALTON CORPORATION) to obtain resin powder for solid freeform fabrication. The fiber added had an average fiber diameter of 18 μm and an average fiber length of 150 μm.

Comparative Example 9

Carbon fiber (TORAYCA® milled fiber, manufactured by Toray Industries, Inc.) was added in an amount of 70 percent by mass as a filler to the PBT resin powder manufactured in Comparative Example 1. The mixture was mixed in dry process for 30 minutes by a screw mixer (mixing stirrer DM type, manufactured by DALTON CORPORATION) to obtain resin powder for solid freeform fabrication. The fiber added had an average fiber diameter of 7 μm and an average fiber length of 130 μm.

Comparative Example 10

Carbon fiber (TORAYCA® milled fiber, manufactured by Toray Industries, Inc.) was added in an amount of 30 percent by mass as a filler to the PBT resin powder manufactured in Comparative Example 1. The mixture was mixed in dry process for 30 minutes by a screw mixer (mixing stirrer DM type, manufactured by DALTON CORPORATION) to obtain resin powder for solid freeform fabrication. The carbon fiber added had an average fiber diameter of 18 μm and an average fiber length of 400 μm.

Example 21

Carbon bead (NICABEADS®, manufactured by Nippon Carbon Co., Ltd.) was added in an amount of 60 percent by mass as a filler to the PBT resin powder treated with annealing manufactured in Example 1. The mixture was mixed in dry process for 30 minutes by a screw mixer (mixing stirrer DM type, manufactured by DALTON CORPORATION) to obtain resin powder for solid freeform fabrication. The added glass bead had a volume average particle diameter of 20 μm.

Example 22

Aluminum bead (atomized aluminum powder #245, manufactured by MINALCO LTD.) was added in an amount of 30 percent by mass as a filler to the PBT resin powder treated with extension manufactured in Example 2. The mixture was mixed in dry process for 30 minutes by a screw mixer (mixing stirrer DM type, manufactured by DALTON CORPORATION) to obtain resin powder for solid freeform fabrication. The added glass bead had a volume average particle diameter of 125 μm.

Example 23

Glass bead (A glass bead for filler, GB301S, manufactured by Potters-Ballotini Co., Ltd.) was added in an amount of 20 percent by mass as a filler to the PBT resin powder treated with ultrasonic wave manufactured in Example 3. The mixture was mixed in dry process for 30 minutes by a screw mixer (mixing stirrer DM type, manufactured by DALTON CORPORATION) to obtain resin powder for solid freeform fabrication. The added bead had a volume average particle diameter of 60 μm.

Comparative Example 11

Glass bead (glass bead GB190M, manufactured by Potters-Ballotini Co., Ltd.) was added in an amount of 20 percent by mass to the PBT resin powder manufactured in Comparative Example 1. The mixture was mixed in dry process for 30 minutes by a screw mixer to obtain powder mixture for solid freeform fabrication. The added bead had a volume average particle diameter of 400 μm.

Comparative Example 12

Glass bead (glass bead J-220, manufactured by Potters-Ballotini Co., Ltd.) was added in an amount of 30 percent by mass to the PBT resin powder manufactured in Comparative Example 1. The mixture was mixed in dry process for 30 minutes by a screw mixer to obtain powder mixture for solid freeform fabrication. The added bead had a volume average particle diameter of 60 μm.

Surface Roughness Ra

Surface roughness was measured by, for example, using a laser microscope (VK-X100, manufactured by KEYENCE CORPORATION).

Orange Peel Property

The surface of the solid freeform fabrication object obtained in the accuracy evaluation was observed to evaluate orange peel property based on the following evaluation criteria.

Evaluation Criteria

A: No unsuitable surface defects such as coarse surface, voids, and warping were observed B: Unsuitable surface defects such as coarse surface, voids, and warping were observed

TABLE 4

| | Resin powder for solid freeform fabrication | | | | | |
|---|---|---|---|---|---|---|
| | | Toughening agent | | | | 50 percent cumulative volume particle diameter (μm) |
| | Resin powder | Kind | Form | Addition amount (percent by mass) | Melting point (degrees C.) | |
| Example 18 | Example 1 | PBT | carbon fiber | Average fiber diameter 7 μm B Average fiber length 130 μm | 60 | 218 | — |
| Example 19 | Example 2 | PBT | Aluminum fiber | Average fiber diameter 7 μm B Average fiber length 130 μm | 30 | 218 | — |
| Example 20 | Example 3 | PBT | Glass fiber | Average fiber diameter 18 μm B Average fiber length150 μm | 5 | 218 | — |
| Comparative Example 9 | Comparative Example 1 | PBT | carbon fiber | Average fiber diameter 7 μm B Average fiber length130 μm | 70 | 218 | — |
| Comparative Example 10 | Comparative Example 1 | PBT | carbon fiber | Average fiber diameter 18 μm B Average fiber length 400 μm | 30 | 218 | — |
| Example 21 | Example 1 | PBT | Carbon bead | Bead diameter 20 μm | 60 | 218 | 41 |
| Example 22 | Example 2 | PBT | Aluminum bead | Bead diameter 150 μm | 30 | 218 | 92 |
| Example 23 | Example 3 | PBT | Glass bead | Bead diameter 60 μm | 20 | 218 | 64 |
| Comparative Example 11 | Comparative Example 1 | PBT | Glass bead | Bead diameter 400 μm | 20 | 218 | 132 |
| Comparative Example 12 | Comparative Example 1 | PBT | Glass bead | Bead diameter 60 μm | 30 | 218 | 64 |

| | Evaluation Results | | | |
|---|---|---|---|---|
| | Recyclability | Accuracy (mm) | Surface roughness (Ra) (μm) | Orange Peel Property |
| Example 18 | A | 0.08 | 42 | A |
| Example 19 | A | 0.06 | 36 | A |
| Example 20 | A | 0.06 | 41 | A |
| Comparative Example 9 | B | 0.41 | | Difficult to fabricate |
| Comparative Example 10 | B | 0.50 | 122 | B |
| Example 21 | A | 0.06 | 31 | A |

TABLE 4-continued

| | Resin powder for solid freeform fabrication | | | |
|---|---|---|---|---|
| Example 22 | A | 0.05 | 42 | A |
| Example 23 | A | 0.06 | 39 | A |
| Comparative Example 11 | B | 0.22 | 94 | B |
| Comparative Example 12 | B | 0.31 | 88 | B |

The values of the conditions 1 to 3 in Examples 18 to 23 and Comparative Examples 9 to 12 were the same as the values in Examples 1 to 3 or Comparative Example 1 used as the resin powder for solid freeform fabrication. In addition, the evaluation results on initial tensile strength were the same as with the evaluation results of Examples 1 to 3 or Comparative Example 1.

Example 24

Controlled thermoplastic resin powder was obtained in the same manner as in Example 1 except that average circularity was controlled under the following condition.

Condition of Controlling Average Circularity

The powder for use in Example 1 was screened by a JIS testing sieve having an opening of 75 μm and a vibratory sieve shaker (AS200digit, manufactured by Retsch GmbH) at full power (100 percent) for 60 minutes. The screened article was used. The powder of Example 1 has higher circularity as the diameter of the powder particle increases. Circularity was decreased by removing the powder with a high circularity.

Example 25

Controlled thermoplastic resin powder was obtained in the same manner as in Example 2 except that average circularity was controlled under the following condition.

Condition of Controlling Average Circularity

The particle for use in Example 2 was subject to treatment by a spheroidizing device (MP type mixer MP5A/1, manufactured by NIPPON COKE & ENGINEERING. CO., LTD.) at a stirring speed of 9,600 rpm for 20 minutes.

Example 26

Controlled thermoplastic resin powder was obtained in the same manner as in Example 6 except that average circularity was controlled under the following condition.

Condition of Controlling Average Circularity

The particle for use in Example 6 was subject to treatment by a spheroidizing device (MP type mixer MP5A/1, manufactured by NIPPON COKE & ENGINEERING. CO., LTD.) at a stirring speed of 9,600 rpm for 20 minutes.

Those obtained resin powders were evaluated on accuracy, recyclability, and initial tensile strength in the same manner as in Example 1. The results are shown in Table 5. Examples 1, 2, and 6 are shown in Table 3 for comparison.

TABLE 5

| | Resin powder for solid freeform fabrication | | | | |
|---|---|---|---|---|---|
| | Kind | Average Circularity | Melting point (degrees C.) | 50 percent cumulative volume particle diameter (μm) | Mv/Mn |
| Example 1 | Example 1 | 0.73 | 218 | 68 | 1.49 |
| Example 24 | Example 1 | 0.67 | 218 | 70 | 1.49 |
| Example 2 | Example 2 | 0.82 | 218 | 60 | 1.15 |
| Example 25 | Example 2 | 0.87 | 218 | 60 | 1.15 |
| Example 6 | Example 6 | 0.8 | 180 | 52 | 1.17 |
| Example 26 | Example 6 | 0.89 | 180 | 52 | 1.15 |

| | Evaluation Results | | |
|---|---|---|---|
| | Recyclability | Accuracy (mm) | Initial Tensile Strength (MPa) |
| Example 1 | A | 0.05 | 43 |
| Example 24 | A | 0.30 | 39 |
| Example 2 | A | 0.01 | 57 |
| Example 25 | A | 0.01 | 63 |
| Example 6 | A | 0.01 | 83 |
| Example 26 | A | 0.01 | 86 |

The values of the conditions 1 to 3 in Examples 24 to 26 were the same as the values of Examples 1, 2, and 6 used as the resin powder for solid freeform fabrication.

Aspects of the present disclosure are, for example, as follows.

1. Resin powder for solid freeform fabrication wherein the resin powder has a 50 percent cumulative volume particle diameter of from 5 to 100 μm and a ratio (Mv/Mn) of a volume average particle diameter (Mv) to a number average particle diameter (Mn) of 2.50 or less and satisfies at least one of the following conditions (1) to (3):

(1): Tmf1>Tmf2 and (Tmf1−Tmf2)≥3 degrees C., where Tmf1 represents a melting starting temperature of an endothermic peak as the resin powder is heated to the temperature 30 degrees C. higher than the melting point of the resin powder at a temperature rising speed of 10 degrees C. per minute for the first time and Tmf2 represents a melting starting temperature of an endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Tmf1 and Tmf2 are measured in differential scanning calorimetry measuring according to ISO 3146 The melting starting temperature of the endothermic peak represents a temperature at a point −15 mW lower from a straight line parallel to X axis drawn from a site where quantity of heat becomes constant after endotherm at the melting point finishes to a lower temperature side, (2): Cd1>Cd2 and (Cd1−Cd2)≥3 percent, where Cd1 represents a crystallinity obtained from an energy amount of the endothermic peak when the resin powder is heated to the temperature 30 degrees C. higher than the melting point of the resin powder at a temperature rising speed of 10 degrees C. per minute for the first time and Cd2 represents a crystallinity obtained from an energy amount of the endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Cd1 and Cd2 are measured in differential scanning calorimetry measuring according to ISO 3146.

(3): Cx1>Cx2 and (Cx1−Cx2)≥3 percent, where Cx1 represents a crystallinity of the resin powder obtained by X-ray diffraction measuring and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

2. The resin powder according to 1 mentioned above, wherein the 50 percent cumulative volume particle diameter is from 20 to 70 μm.

3. The resin powder according to 1 or 2 mentioned above, wherein the resin powder has a melting point of 100 degrees C. or higher as measured according to ISO 3146.

4. The powder resin according to any one of 1 to 3 mentioned above, wherein the ratio (Mv/Mn) of the volume average particle diameter (Mv) to the number average particle diameter (Mn) is 1.50 or less.

5. The resin powder according to any one of 1 to 4 mentioned above, further including at least one member selected from the group consisting of polyolefin, polyamide, polyester, polyarylketone, polyphenylene sulfide, a liquid crystal polymer, polyacetal, polyimide, and a fluorochemical resin.

6. The resin powder according to any one of 1 to 5 mentioned above, wherein polyamide includes at least one member selected from the group including an aromatic polyamide, consisting of polyamide 410, polyamide 4T, polyamide 6, polyamide 66, polyamide MXD6, polyamide 610, polyamide 6T, polyamide 11, polyamide 12, polyamide 9T, polyamide 10T, and aramid.

7. The resin powder according to 5 or 6 mentioned above, wherein polyester includes at least one member selected from the group consisting of polyethylene terephthalate, polybutylene terephthalate, and polylactate.

8. The resin powder according to any one of 5 to 7 mentioned above, wherein polyaryl ketone includes at least one member selected from the group consisting of polyether ether ketone, polyether ketone, and polyether ketone ketone.

9. The resin powder according to any one of 5 to 8 mentioned above, wherein polyamide includes either or both of polyamide 66 and polyamide 9T.

10. The resin powder according to 5 or 9 mentioned above, wherein polyester includes polybutylene terephthalate.

11. The resin powder according to any one of 5 to 10 mentioned above, wherein polyaryl ketone includes poly ether ether ketone.

12. The resin powder according to any one of 1 to 11 mentioned above, further includes a fluidizer.

13. The resin powder according to 12 mentioned above, wherein the fluidizer has a proportion of from 0.1 to 10 percent by mass.

14. The powder material according to 12 or 13 mentioned above, wherein the fluidizer has a volume average particle diameter of less than 10 micrometer.

15. The resin powder according to any one of 1 to 14 mentioned above, further includes a toughening agent.

16. The resin powder according to any one of 1 to 15 mentioned above, wherein the resin powder has a bulk density of 0.3 g/mL or greater.

17. The resin powder according to 16 mentioned above, wherein the resin powder has a bulk density of 0.35 g/mL or greater.

18. The resin powder according to 18 mentioned above, wherein the resin powder has a bulk density of 0.4 g/mL or greater.

19. The resin powder according to any one of 1 to 19 mentioned above, wherein the resin powder has an average circularity of 0.83 in a range of the particle diameter of from 0.5 to 200 μm.

20. The resin powder according to any one of 1 to 20 mentioned above, further includes a flame retardant.

21. A device for manufacturing a solid freeform fabrication object, includes a layer forming device to form a layer including the resin powder of any one of 1 to 20 mentioned above; and a powder attaching device to attach the resin powder to each other in a selected area of the layer.

22. A method of manufacturing a solid freeform fabrication object, includes forming a layer including the resin powder of any one of 1 to 20 and irradiating the layer with electromagnetic wave to melt the layer, cooling down the layer, curing the layer, and repeating the forming, the irradiating, the cooling down, and the curing.

23. The method according to 23 mentioned above, wherein the electromagnetic wave irradiation source is at least one member selected from the group consisting of $CO_2$ laser, infra red irradiation source, a microwave generator, a radiant heater, and a LED lamp.

24. A solid freeform fabrication object characterized by being manufactured according to the method of manufacturing a solid freeform fabrication object of 22 or 23 mentioned above.

According to the present disclosure, resin powder for solid freeform fabrication is provided, which has excellent recyclability, enhances tensile strength of obtained solid freeform fabrication objects, and is capable of easily and efficiently manufacturing complicated and fine solid freeform fabrication objects.

Having now fully described embodiments of the present disclosure, it will be apparent to one of ordinary skill in the art that many changes and modifications can be made thereto without departing from the spirit and scope of embodiments of the disclosure as set forth herein.

What is claimed is:

1. A method of manufacturing a solid freeform fabrication object, comprising:
   forming a layer including a resin powder,
      wherein the resin powder has a 50 percent cumulative volume particle diameter of from 5 to 100 μm, a ratio (Mv/Mn) of a volume average particle diameter (Mv) to a number average particle diameter (Mn) of 1.50 or less, and satisfies at least one of the following conditions (1) to (3):
   (1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for a first time, and
   Tmf2 represents a melting starting temperature of an endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and
   both Tmf1 and Tmf2 are measured in differential scanning calorimetry measuring according to ISO 3146, wherein the melting starting temperature of the endothermic peak represents a temperature at a point −15 mW lower from a straight line parallel to X axis drawn from a site where quantity of heat becomes constant after endotherm at the melting point finishes to a lower temperature side,
   (2): Cd1>Cd2 and (Cd1−Cd2)≥3 percent,
      where Cd1 represents a crystallinity obtained from an energy amount of the endothermic peak when the resin powder is heated to a temperature 30 degrees C. higher than the melting point of the resin powder at a temperature rising speed of 10 degrees C. per minute for a first time, and Cd2 represents a crystallinity obtained from an energy amount of the endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and
      both Cd1 and Cd2 are measured in differential scanning calorimetry measuring according to ISO 3146, and
   (3): Cx1>Cx2 and (Cx1−Cx2)≥3 percent,
      where Cx1 represents a crystallinity of the resin powder obtained by X-ray diffraction measuring, and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere; and
   irradiating the layer with electromagnetic waves to melt the layer, and
   wherein said resin powder comprises at least one thermoplastic resin selected from the group consisting of a polyolefin, a polyarylketone, a polyphenylene sulfide, a liquid crystal polymer, a polyacetal, a polyimide and a fluorochemical resin,
   the resin powder has an average circularity of from 0.83 to 0.89 in a range in which the resin powder has a particle diameter of from 0.5 to 200 μm,
   the resin powder is constituted by resin particles having a pillar-like form,
   the resin powder has no shell portions, and
   a proportion of pillar-like form particles to resin powder of 90% by mass or greater.

2. The method according to claim 1, wherein the method is a selective laser sintering (SLS) method.

3. The method according to claim 1, wherein the resin powder has a 50 percent cumulative volume particle diameter of from 15 to 100 μm.

4. The method according to claim 1, wherein the resin powder has a melting point of 100 degrees C. or higher as measured according to ISO 3146.

5. The method according to claim 1, wherein said resin powder satisfies at least one of the following conditions (2) to (3).

6. A method of manufacturing a solid freeform fabrication object, comprising:
   forming a layer including a resin powder,
      wherein the resin powder has a 50 percent cumulative volume particle diameter of from 5 to 100 μm, a ratio (Mv/Mn) of a volume average particle diameter (Mv) to a number average particle diameter (Mn) of 2.50 or less, and satisfies at least one of the following conditions (2) and (3):
   (2): Cd1>Cd2 and (Cd1−Cd2)≥3 percent, where Cd1 represents a crystallinity obtained from an energy amount of the endothermic peak when the resin powder is heated to a temperature 30 degrees C. higher than the melting point of the resin powder at a temperature rising speed of 10 degrees C. per minute for a first time, and Cd2 represents a crystallinity obtained from an energy amount of the endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146, and
   (3): Cx1>Cx2 and (Cx1−Cx2)≥3 percent,
      where Cx1 represents a crystallinity of the resin powder obtained by X-ray diffraction measuring, and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere; and irradiating the layer with electromagnetic waves to melt the layer, and wherein said resin powder comprises at least one thermoplastic resin selected from the group consisting of a polyolefin, a polyarylketone, a polyphenylene sulfide, a liquid crystal polymer, a polyacetal, a polyimide and a fluorochemical resin, the resin powder has an average circularity of 0.87 or greater in a range in which the resin powder has a particle diameter of from 0.5 to 200 μm, the resin powder is constituted by resin particles having a pillar-like form, and the resin powder has no shell portions.

\* \* \* \* \*